(12) United States Patent
Aoyama

(10) Patent No.: US 6,512,888 B2
(45) Date of Patent: Jan. 28, 2003

(54) SELECTION POINT SELECTING APPARATUS

(75) Inventor: Keisuke Aoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/768,332

(22) Filed: Jan. 25, 2001

(65) Prior Publication Data

US 2001/0017982 A1 Aug. 30, 2001

(30) Foreign Application Priority Data

Feb. 1, 2000 (JP) ......................................... 2000-023446

(51) Int. Cl.[7] ........................... G03B 3/00; G03B 13/30; G03B 17/20
(52) U.S. Cl. ........................ 396/121; 396/147; 396/296
(58) Field of Search ................................. 396/121, 147, 396/296, 297, 299; 348/345, 346

(56) References Cited

U.S. PATENT DOCUMENTS 5,659,814 A   8/1997  Matsukawa et al. ........ 396/121
5,692,222 A   11/1997 Yamada et al. ............... 396/51
5,832,323 A * 11/1998 Goto .......................... 396/297
6,085,042 A * 7/2000  Yamamoto .................. 396/121

* cited by examiner

Primary Examiner—Russell Adams
Assistant Examiner—Arthur A Smith
(74) Attorney, Agent, or Firm—Fitzpatrick, Cella, Harper & Scinto

(57) ABSTRACT

A selection point selecting apparatus is provided with a first selection point group including an upper side selection part composed of a plurality of selection points, a lower side selection part composed of a plurality of selection points, a right side selection part including at least one selection point and a left side selection part including at least one selection point. A first selecting device is arranged to select, in accordance with a direction of an operation on a first operation member, a selection point from among the first selection point group in a circular manner in a direction corresponding to the direction of the operation. A second selecting device is arranged to select, in response to an operation on a second operation member, a selection point other than the selection points of the first selection point group.

17 Claims, 19 Drawing Sheets

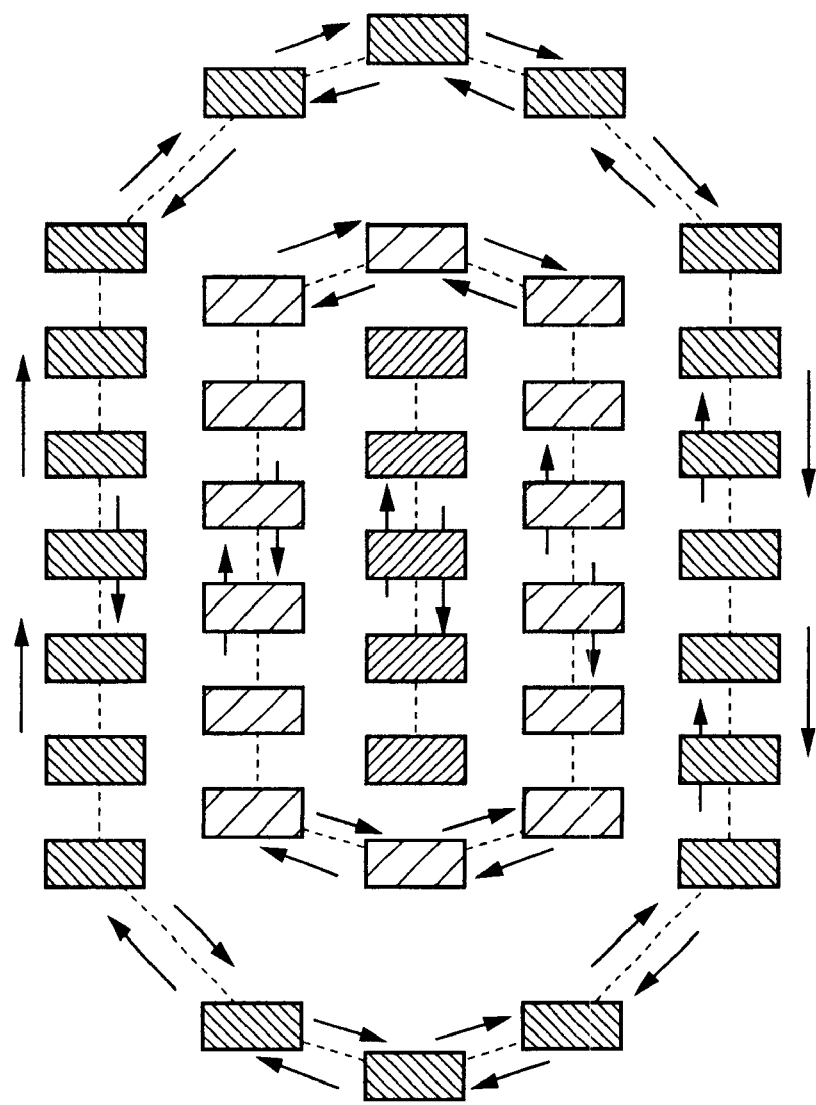
FIG. 4(b)
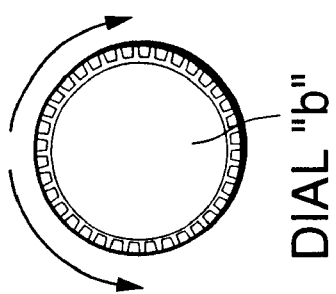
FIG. 4(a) DIAL "b"

GROUP G14

DIAL "b" ROTATING

SELECTION POINT SELECTING APPARATUS

BACKGROUND OF THE INVENTION

1. Field of the Invention

The present invention relates to an improvement on a selection point selecting apparatus for selecting a point from among a plurality of selection points.

2. Description of Related Art

FIGS. 18(a) to 18(c) and FIGS. 19(a) to 19(c) show, by way of example, an apparatus conventionally arranged for selecting a point from among a plurality of selection points.

FIG. 18(a) shows the vertical shifts of position of a mark (hereinafter referred to as an AF point) which indicates a focus detecting point selecting position within an image plane. When a dial input member such as that shown in FIG. 18(b) is operated clockwise, for example, the clockwise input causes the AF point selecting position to shift upward from a lower position to a higher position, as shown in FIG. 18(a), in the order of point e10→point d9 and point d11→point c10→point b9 and point b11→point a10. When the dial input member is operated counterclockwise, the counterclockwise input causes the AF point selecting position to shift downward from a higher position to a lower position in the order of point a10→point b9 and point b11→point c10→point d9 and point d11→point e10. Further, when a cruciform input switch such as that shown in FIG. 18(c) is operated upward, the upward input operation causes the AF point selecting position to shift from a lower position to a higher position. A downward input operation on the cruciform input switch causes the AF point to shift from a higher position to a lower position.

Further, the AF point is arranged to be horizontally shifted, as shown in FIG. 19(a), by operating another dial input member such as that shown in FIG. 19(b). The horizontal shifting input operation causes the AF point selecting position to shift in the order of point c0→ - - - →point c8→point c10→point c12→point c14→ - - - →point c20 or point c20→ - - - →point c14→point c12→point c10→point c8→ - - - →point c0. In a case where a cruciform input switch shown in FIG. 19(c) is operated for input, the AF point selecting position of the apparatus is caused to shift to the right by a rightward input operation on the switch and to the left by a leftward input operation.

Meanwhile, a method for selecting by means of a cruciform key is disclosed in U.S. Pat. No. 5,659,814. Further, a method for selecting an AF point is disclosed in U.S. Pat. No. 5,692,222.

However, the apparatuses using rotary input members such as dial input members or cruciform input switches have left room for improvement in the following points.

(i) The apparatus arranged to use rotary input members such as two dial input members does not enable the user of the apparatus to directly perceive the progress of a selecting operation as the AF point linearly shifts for a rotative input. Besides, it is not easily discernible which of the two dial input members is for the vertical shift and which of them is for the horizontal shift.

(ii) In a case where a cruciform input switch is used, the shifting direction of the AF point is directly perceivable. However, input operations become difficult in the event of a large amount of shift of an AF point selecting position. Further, in a case where the AF point selecting position is to be varied only in an area located around the center or only in a peripheral area of an image plane, a desired AF point cannot be selected unless the AF point selecting position is shifted many times both in the vertical direction and in the horizontal direction.

BRIEF SUMMARY OF THE INVENTION

The invention is directed to the solution of the problems of the prior art described in the foregoing.

It is, therefore, an object of the invention to provide a selection point selecting apparatus which is arranged to enable the user thereof to efficiently select a selection point in the direction of circular search in a directly-perceivable manner and to efficiently select selection points also in other directions.

To attain the above object, in accordance with an aspect of the invention, there is provided a selection point selecting apparatus, which comprises a first selection point group including an upper side selection part composed of a plurality of selection points, a lower side selection part composed of a plurality of selection points, a right side selection part including at least one selection point and a left side selection part including at least one selection point, and a selection point not belonging to the first selection point group, wherein first selection means selects a selection point from among the first selection point group in accordance with a direction of an operation on a first operation member, and second selection means selects the selection point not belonging to the first selection point group in response to an operation on a second operation member.

The above and other objects and features of the invention will become apparent from the following detailed description of preferred embodiments thereof taken in connection with the accompanying drawings.

BRIEF DESCRIPTION OF THE SEVERAL VIEWS OF THE DRAWING

FIGS. 4(a) and 4(b) are diagrams for explaining the shifting directions of AF point selection made according to a rotative input operation performed on a dial "b" shown in FIG. 1.

DETAILED DESCRIPTION OF THE INVENTION

Hereinafter, preferred embodiments of the invention will be described in detail with reference to the drawings.

(First Embodiment)

Figure 1:
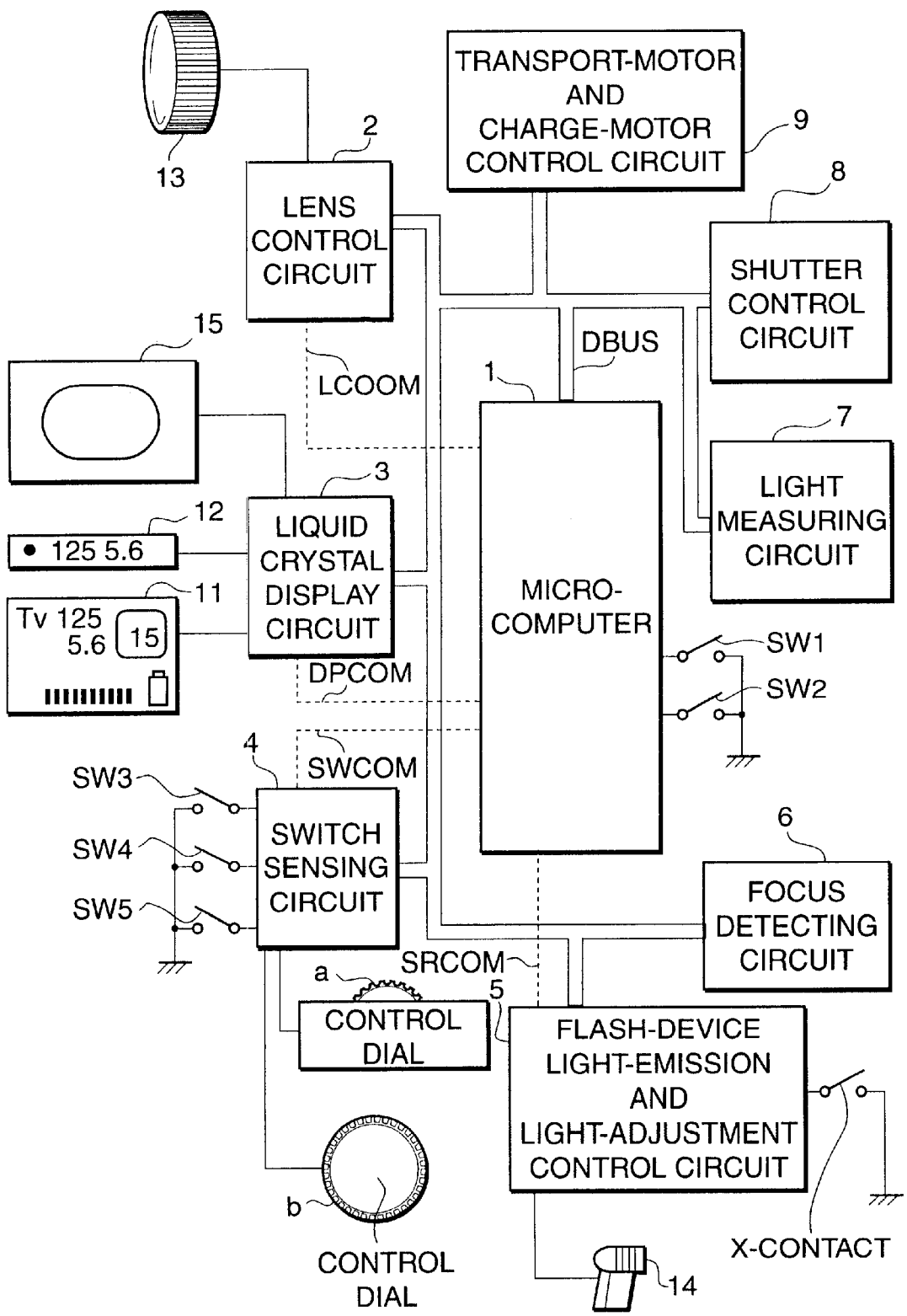
FIG. 1 is a block diagram showing in outline the arrangement of a camera according to a first embodiment of the invention.

FIG. 1 shows in a block diagram the electrical arrangement of a camera according to a first embodiment of the invention.

Referring to FIG. 1, a microcomputer 1 is arranged to control the actions of each part of the camera. A lens control circuit 2 is arranged to control the driving action of a motor for adjusting the focus of a photo-taking lens 13 and that of a motor for controlling diaphragm blades. The lens control circuit 2 serially communicates with the microcomputer 1 through a data bus DBUS while receiving a signal LCOM from the microcomputer 1. Upon receipt of lens driving information through the serial communication from the microcomputer 1, the lens control circuit 2 controls the photo-taking lens 13 to be driven accordingly. By the serial communication, the lens control circuit 2 sends to the microcomputer 1 information of varied kinds (focal length, etc.) on the photo-taking lens 13.

A liquid crystal display circuit 3 is arranged to drive liquid crystal display members 11 and 12 which are provided for informing the user of a remaining amount of energy of a battery, a number of frames used for photo-taking, a shutter time value Tv, an aperture value Av, an exposure compensation value, a focusing state, etc. The liquid crystal display circuit 3 drives also a liquid crystal display device 15 which is arranged on a focusing screen as will be described later herein. The liquid crystal display circuit 3 conducts, through the data bus DBUS, aerial communication with the microcomputer 1 while receiving a signal DPCOM from the microcomputer 1. Upon receipt of display data from the microcomputer 1 through the serial communication, the liquid crystal display circuit 3 drives the liquid crystal display members 11, 12 and 15 in accordance with the data received.

A switch sensing circuit 4 is arranged to find the state of switches arranged to allow the user to set various photo-taking conditions and that of switches arranged to indicate the states of the camera. The switch sensing circuit 4 conducts serial communication to send switch data to the microcomputer 1 through the data bus DBUS while receiving a signal SWCOM from the microcomputer 1. When a control dial "a" is operated to input a value, the switch sensing circuit 4 counts the dial value upward or downward according to the input value and sends the count value to the microcomputer 1 through the data bus DBUS by serial communication while receiving the signal SWCOM. In other words, the microcomputer 1 is provided with information on the direction of rotation of the control dial "a" by the upward or downward count and information on the amount of rotation of the control dial "a" by an increase or decrease of the count value. The switch sensing circuit 4 provides the microcomputer 1 also with information on the count value relative to a control dial "b" in the same manner as for the control dial "a".

A flash-device light-emission and light-adjustment control circuit 5 controls light emission of a flash device and a light emission stopping action by making TTL light adjustment. The flash-device light-emission and light-adjustment control circuit 5 is arranged to conduct serial communication with the microcomputer 1 through the data bus DBUS while receiving a signal SRCOM from the microcomputer 1. The flash-device light-emission and light-adjustment control circuit 5 thus obtains data relative to control over the flash device and performs control of varied kinds accordingly. Further, the flash-device light-emission and light-adjustment control circuit 5 is arranged to act as an interface when an external flash device 14 is mounted on the camera. In a case where the external flash device 14 is mounted, the flash-device light-emission and light-adjustment control circuit 5 communicates with the external flash device 14 and sends information to the microcomputer 1 as to whether or not there is provided any auxiliary light emitting means. The flash-device light-emission and light-adjustment control circuit 5 also serves to send the control signals from the microcomputer 1 to the external flash device 14.

A focus detecting circuit 6 is composed of a photoelectric conversion sensor which is arranged to detect focus by a known phase-difference detecting method and a circuit unit which is arranged to read data accumulated by the photoelectric conversion sensor. The focus detecting circuit 6 operates under the control of the microcomputer 1. The microcomputer 1 detects focus by carrying out a known algorithm on the basis of the A/D-converted value of the output of the photoelectric conversion sensor. A lens driving amount is computed according to the result of the focus detection. The microcomputer 1 communicates information on the lens driving amount thus computed to the lens control circuit 2. The photo-taking lens 13 is driven to an in-focus position accordingly. After an in-focus state is thus attained for one focusing area (one of AF points), other focusing areas are examined to find if they are within an in-focus range or within a depth of field. In the event of manual focusing, only a check is made for an in-focus state and the lens is not driven.

A light measuring circuit 7 is arranged to measure the luminance of an object of shooting and to send a light measurement output to the microcomputer 1 under the control of the microcomputer 1. The microcomputer 1 A/D(analog-to-digital)-converts the light measurement output to use it for setting exposure conditions (an aperture value and a shutter speed). A shutter control circuit 8 is arranged to control the travel of a leading shutter curtain and that of a trailing shutter curtain according to control signals from the microcomputer 1. A transport-motor and charge-motor control circuit 9 is arranged to control film transport (film winding and film rewinding) according to control signals from the microcomputer 1. The transport-motor and charge-motor control circuit 9 is arranged also to control a motor which is provided for moving up and charging (moving down) a quick-return mirror.

A switch SW1 is provided for causing the camera to make preparation for the commencement of a photo-taking operation. When the microcomputer 1 finds that the switch SW1 is turned on, the light measuring, focus detecting and display actions are caused to begin. A switch SW2 is provided for causing the camera to start the photo-taking operation. When the microcomputer 1 finds that the switch SW2 is turned on, an exposure action is caused to begin. An X-contact is arranged to turn on when the travel of the leading shutter curtain comes to an end to inform the flash-device light-emission and light-adjustment control circuit 5 of the timing of light emission by the flash device. A switch SW3 is a mode selection switch for changing the mode of the camera from one mode over to another among the various modes including a shutter time (Tv) priority mode, an aperture value (Av) priority mode, a manual mode, a program mode, etc.

The control dial "a" (hereinafter will be referred to simply as the dial "a") is provided for varying a shutter time value, an aperture value, the mode, etc. For example, when the dial "a" is turned while pushing the mode selection switch SW3, the mode selection is made in the order of Tv priority mode→Av priority mode→manual mode→program mode→Tv priority mode→Av priority mode→manual mode→program mode→ - - - . The dial "a" thus enables the user to set the camera to a mode as desired by the user. When the dial "a" is reversely turned, the order of selection shown above is reversed as program mode→manual mode→Av priority mode→Tv priority mode→program mode→ - - - . Further, with the mode set to the Tv (shutter time value) priority mode jointly by the switch SW3 and the dial "a", the user can set the shutter time to a desired value by turning the dial "a" or the dial "b". In a case where the Av (aperture value) priority mode is set by the switch SW3 and the dial "a", the user can set a desired aperture value Av by turning the dial "a" or the dial "b".

A switch SW4 is an Av value setting switch which is provided for setting an Av value when the camera is in the manual (operation) mode. With the manual mode selected jointly by the switch SW3 and the dial "a", when the dial "b" is turned without pushing the switch SW4, the Tv value increases or decreases as much as the amount to which the dial "b" is operated by the user, so that the Tv value can be set to a desired value. Then, when the dial "a" or the dial "b" is turned while pushing the switch SW4 at the same time, the Av value increases or decreases as much as the amount to which the dial "a" or the dial "b" is operated by the user, so that the Av value can be set to a desired value.

A switch SW5 is provided for setting an AF point selecting mode. An AF point to be used for detecting focus can be selected from among others by turning the dial "a" or the dial "b" with the AF point selecting mode set by the switch SW5. An automatic AF point selecting mode in which the camera automatically makes focus adjustment can be set by designating all the AF points by turning the dial "a" or the dial "b" with the AF point selecting mode set by the switch SW5.

The external display device 11 is arranged to be driven by the liquid crystal display circuit 3, which is arranged to drive also the viewfinder liquid crystal display member 12. The photo-taking lens 13 is an interchangeable lens and is controlled through the lens control circuit 2. The external flash device 14 is controlled through the flash-device light-emission and light-adjustment control circuit 5. Further, the external flash device 14 has a power supply separately from a power supply disposed within the camera body. The liquid crystal display member 15 is arranged on a focusing screen to display the result of focus detection and information on the AF point selection. In the case of the first embodiment, the liquid crystal display member 15 is arranged to have 45 segments corresponding to 45 AF points and to be capable of making displays viewable inside the viewfinder.

Figure 2A:
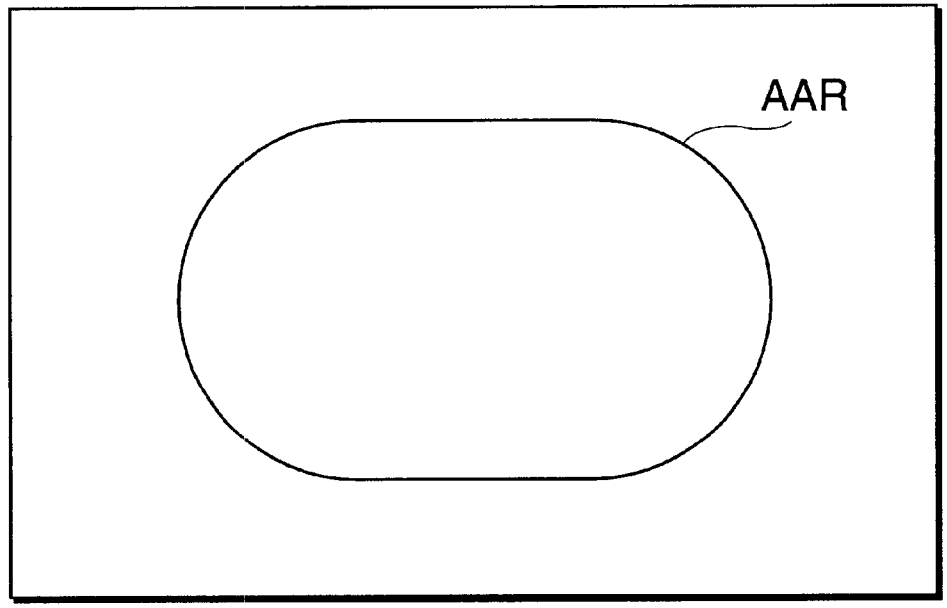
FIGS. 2(a) and 2(b) are diagrams showing a display made inside a viewfinder of the camera shown in FIG. 1.
Figure 2B:
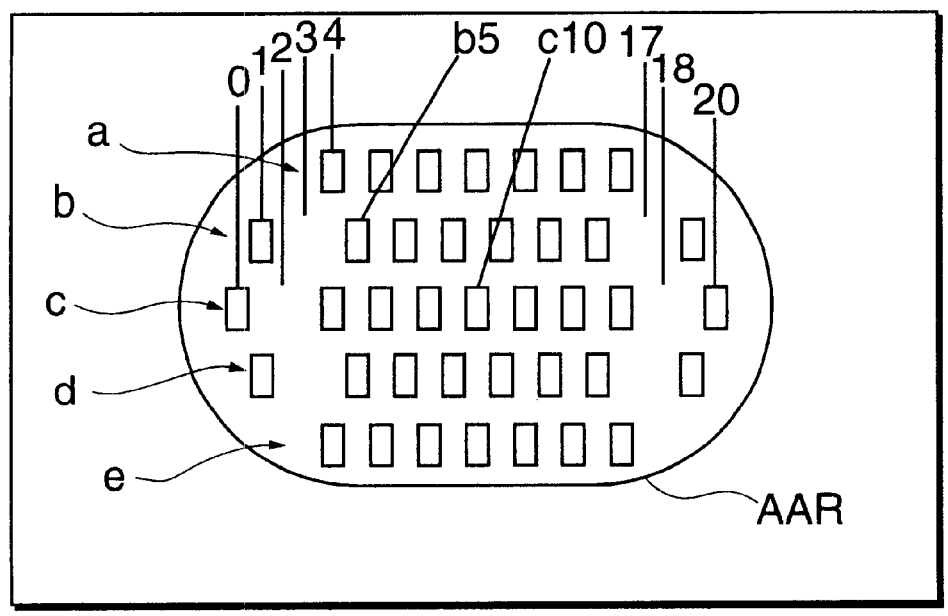

FIGS. 2(a) and 2(b) are diagrams for explaining displays made within the viewfinder of the camera having the above-mentioned construction. FIG. 2(a) shows a state which continues without any AF point on display until the focusing state reaches an in-focus state. In FIG. 2(a), reference symbol AAR denotes a whole focus detection area. Focus is detectable within the area AAR.

FIG. 2(b) shows a state in which all AF points are on display. The AF points are denoted with lines (rows) "a", "b", "c", "d" and "e" vertically aligned from the top line "a" to the bottom line "e" and with numbers assigned to the points of each line, from the left to the right, as "0", "1", - - - "20". However, no AF point exists at parts corresponding to the points "2", "3", "17" and "18", as shown in FIG. 2(b). According to this display method, for example, a central AF point is expressed as "c10". In the second line from the top line, an AF point located second from the left end of the line is expressed as "b5". The left end AF point of the top (highest) line is expressed as "a4". In the bottom line, an AF point which is located at the right end of the line is expressed as "e16" (not shown).

Figure 3A:
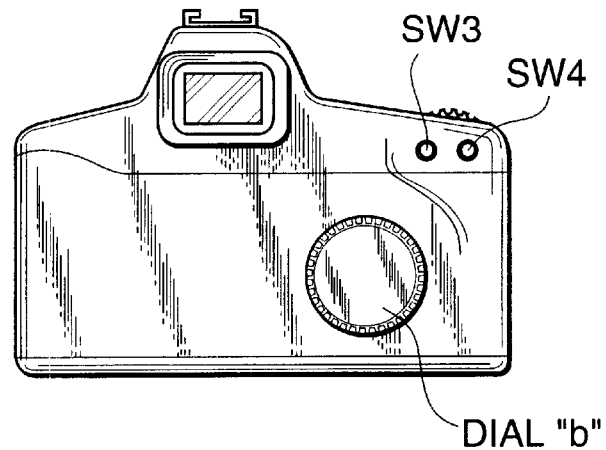
FIGS. 3(a), 3(b) and 3(c) are diagrams showing the appearance of the camera shown in FIG. 1.
Figure 3B:
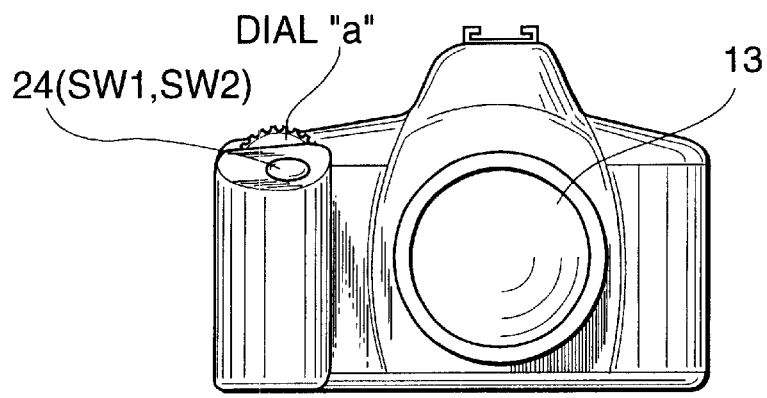
Figure 3C:
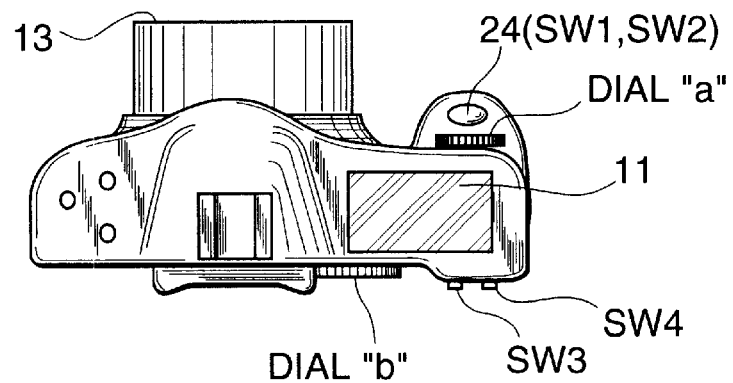

FIGS. 3(a), 3(b) and 3(c) show the appearance of the camera. Of these figures, FIG. 3(a) is a rear view of the camera, FIG. 3(b) is a front view of the camera, and FIG. 3(c) is a top view of the camera. In these figures, all parts that are the same as those shown in FIG. 1 are denoted by the same reference symbols as in FIG. 1.

Referring to FIGS. 3(a) to 3(c), the camera is provided with a release button 24. The switch SW1 turns on when the release button 24 is pushed halfway of its full stroke. The switch SW2 turns on when the release button 24 is pushed further to its full stroke. The dial "a" is disposed near to the release button 24 at a position where the dial "a" can be easily operated with the index finger. Therefore, the dial "a" can be operated while the user is peeping into the viewfinder. The dial "b" is disposed on the back side of the camera at a position where it can be operated with the thumb while the user is holding the camera in a photo-taking posture. Both the dials "a" and "b" are rotative input members arranged to give a clicking feeling. When the user turns the dial "a" or "b", information on the rotating direction thereof and the number of clicks thereof is inputted. The switches SW3 and SW4 are also disposed on the back side of the camera at such positions that they can be operated while the user is peeping into the viewfinder. Reference numeral 11 denotes the external display device which is also shown in FIG. 1. Reference numeral 13 denotes the interchangeable photo-taking lens which is shown in FIG. 1.

The camera arranged as described above selects an AF point in a manner as described below.

FIG. 4(a) shows the directions of a rotative input operation on the dial "b". The directions of the rotative input operation are shown as viewed from the rear side of the camera. FIG. 4(b) shows the directions in which the AF point selection shifts for the rotative input operation of the dial "b". The position of the AF point selection shifts in the same direction as the rotating direction of the dial "b".

Figure 5B:
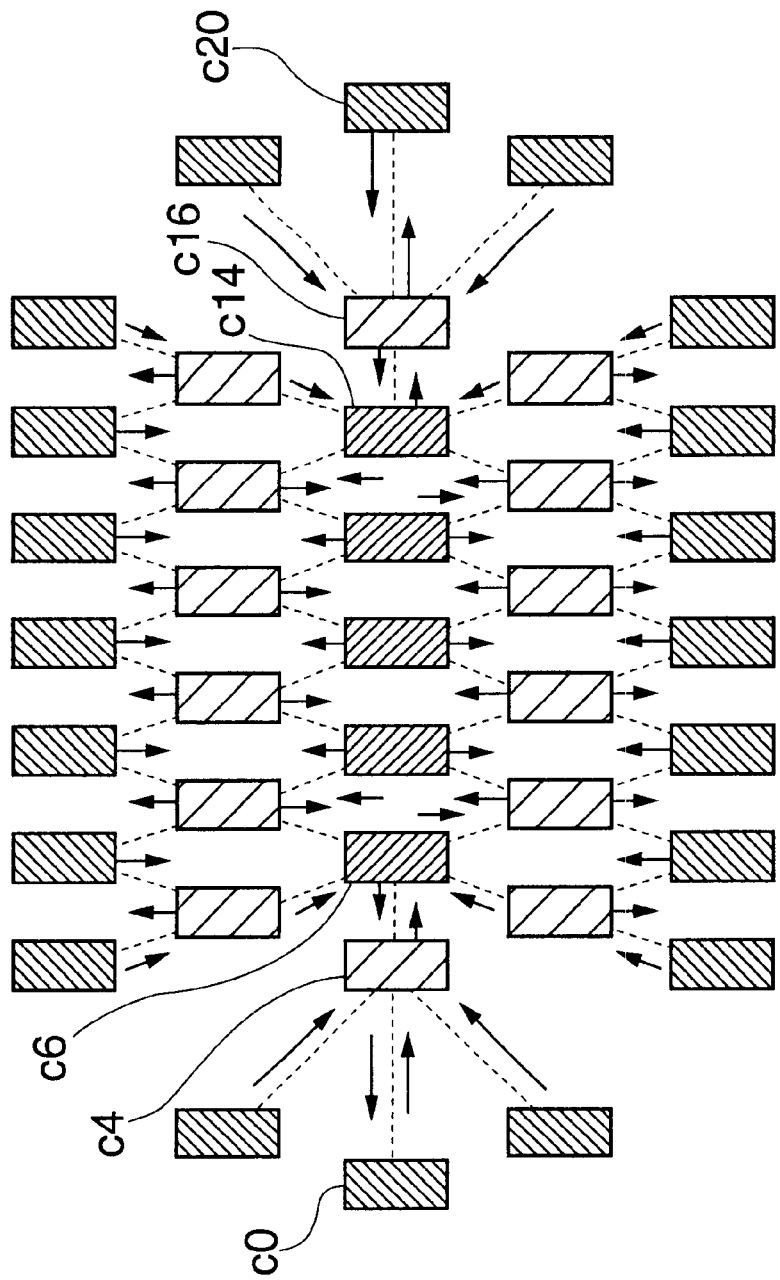
FIGS. 5(a) and 5(b) are diagrams for explaining the shifting directions of AF point selection made according to a rotative input operation performed on a dial "a" shown in FIG. 1.
Figure 5A:
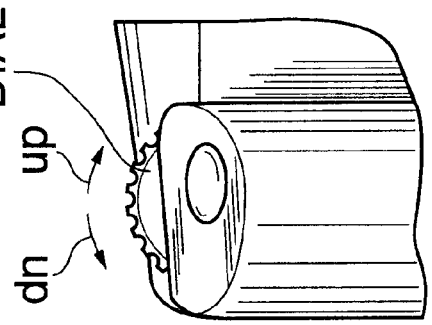

FIG. 5(a) shows the directions of a rotative input operation on the dial "a". The directions of the rotative input operation are shown as viewed from the front side of the camera. The user of the camera is, therefore, assumed to be operating the dial "a" in the directions reverse to the directions shown in FIG. 5(a), i.e., from the rear side of the camera. FIG. 5(b) shows the directions in which the AF point selection shifts for the rotative input operation of the dial "a".

The position of the AF point selection shifts in response to the rotative input operation on the dial "a" as follows. Referring to FIG. 5(b), when the rotative input operation is performed on the dial "a" in the direction of an arrow "up" as shown in FIG. 5(a), the AF point selection for all AF points, except six AF points c0, c4, c6, c14, c16 and c20, shifts upward as viewed in FIG. 5(b). When the rotative input operation on the dial "a" is in the direction of an arrow "dn" as shown in FIG. 5(a), the AF point selection shifts downward as viewed in FIG. 5(b).

With respect to the AF points c0, c4, c6, c14, c16 and c20, the AF point selecting directions differ from the above-stated directions, as follows. When the dial "a" is turned in the direction of the arrow "up" while the current AF point selecting position of the camera is at the AF point c6, the AF point selecting position shifts in the order of point c6→point c4→point c0. When the dial "a" is turned in the same direction "up" while the current AF point selecting position is at the AF point c20, the AF point selecting position shifts in the order of (point) c20→c16→c14. When the dial "a" is turned in the direction of the arrow "dn" while the current AF point selecting position is at the AF point c0, the AF point selecting position shifts in the order of c0→c4→c6. When the dial "a" is turned in the same direction "dn" while the current AF point selecting position is at the AF point c14, the AF point selecting position shifts in the order of c14→c16→c20.

AF point selecting actions to be performed within a group G20 of AF points when the dial "b" is turned are next described below with reference to FIGS. 6(a) and 6(b).

Figure 6A:
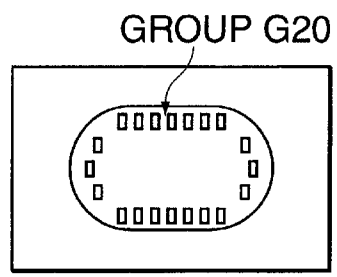
FIGS. 6(a) and 6(b) are diagrams for explaining the shifting directions of AF point selection made within an AF point group G20 in the camera shown in FIG. 1.
Figure 6B:
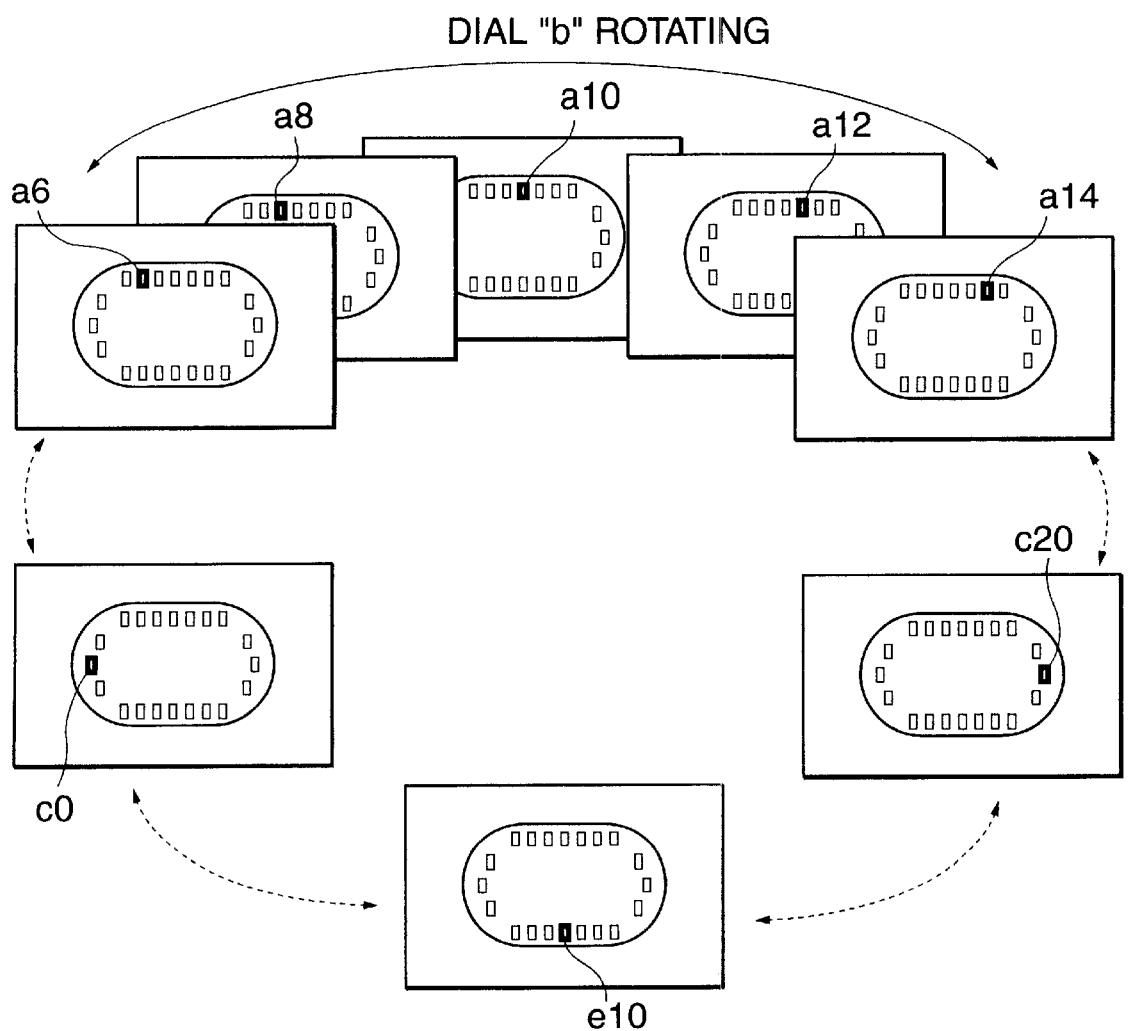

FIG. 6(a) shows 20 AF points of the group G20, which is located in an outermost area. In a case where one of the 20 AF points shown in FIG. 6(a) is selected, the position of AF point selection is shifted by an input operation on the dial "b" in the same direction as the direction in which the dial "b" is turned (clockwise or counterclockwise, or to the right or to the left).

The AF point selection is described in detail with reference to FIG. 6(b) as follows. Assuming that the AF point currently selected is a point a10, the selected AF point changes from the point a10 to a point a12 when the dial "b" is turned to the right to the extent of one click and to another point a14 when the dial "b" is turned further to the right by one click. The selected AF point then shifts according to the number of clicks in the direction of c20, - - - , e10, - - - , c0, - - - one after another.

In a case where the dial "b" is turned to the left, the AF point selection is made as follows.

Assuming that the position of an AF point which has been initially selected is at the point a10, a leftward input operation on the dial "b" causes the selected AF point to shift to a point a8 when the operation is performed by one click and to a point a6 when the operation is performed further by one click. The leftward input operation on the dial "b" thus causes the position of the selected AF point to shift as a8, a6, - - - , c0, - - - , e10, - - - , c20, - - - , a14, - - - .

The AF point selection to be made within an AF point group G14 with a rotative input operation performed on the dial "b" is described below with reference to FIGS. 7(a) and 7(b).

Figure 7A:
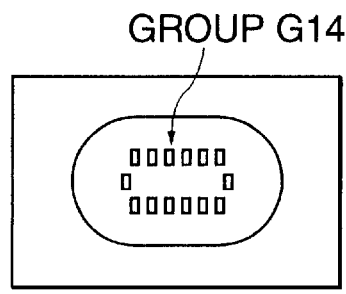
FIGS. 7(a) and 7(b) are diagrams for explaining the shifting directions of AF point selection made within an AF point group G14 in the camera shown in FIG. 1.
Figure 7B:
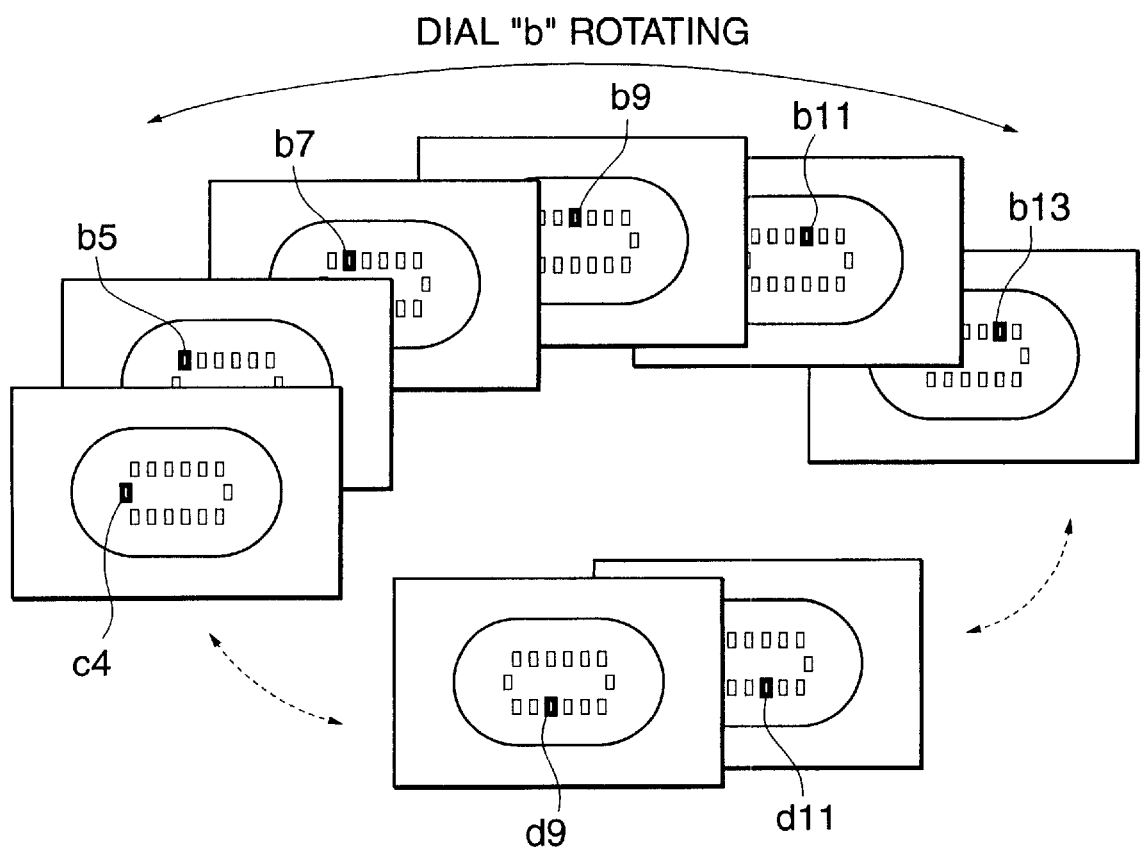

FIG. 7(a) shows AF points of the intermediate AF point group G14. In a case where one of the points shown in FIG. 17(a) has been selected, a rotative input operation on the dial "b" causes the position of the selected AF point to shift in the same direction as the direction in which the dial "b" is turned.

The details of the AF point selection mentioned above are described in detail referring to FIG. 7(b) as follows. Assuming that the AF point currently selected is a point b9, the selected AF point changes from the point b9 to a point b11 when the dial "b" is turned to the right to the extent of one click and to another point b13 when the dial "b" is turned further to the right by one click. The selected AF point thus shifts according to the number of clicks in the direction of d11, d9, - - - , c4, - - - , b5, b7, - - - one after another.

When the dial "b" is turned to the left, the AF point selected shifts in the direction of b9, b7, b5, c4, - - - , d9, d11, - - - , b13, b11, b9, - - - .

The AF point selection to be made within an AF point group G05 with a rotative input operation performed on the dial "b" is described below with reference to FIGS. 8(a) and 8(b).

Figure 8A:
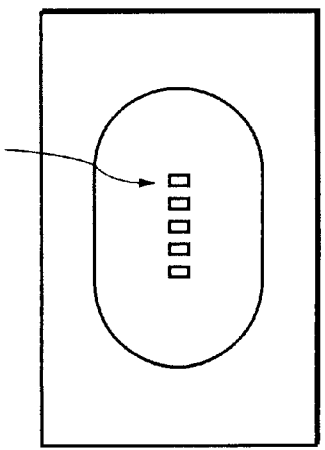
FIGS. 8(a) and 8(b) are diagrams for explaining the shifting directions of AF point selection made within an AF point group G05 in the camera shown in FIG. 1.

FIG. 8(a) shows five AF points of the central AF point group G05. In a case where one of the points shown in FIG. 8(a) has been selected, a rotative input operation on the dial "b" causes the position of the selected AF point to shift to the right or left according to the direction in which the dial "b" is turned. Since the AF points of the AF point group G05 are aligned in a straight line, the AF point selecting position shifts in a linear manner and not in a rotative or circular manner. A rightward (clockwise) rotative input operation on the dial "b" causes the position of the selected AF point to shift in the order of points c6→c8→c10→c12→c14 one after another. With the point c14 thus selected, the position of the selected AF point does not shift any further from the point c14 even if the rotative input is made to the right. A leftward (counterclockwise) rotative input operation on the dial "b" causes the AF point selection to shift in the order of points c14÷c12→c10→c8→c6 one after another and causes no shift to the left from the point c6 any further.

The shift of the AF point selecting position between the AF point groups resulting from a rotative input operation on the dial "a" is next described below with reference to FIGS. 9(a) and 9(b).

The shift between the AF point groups is effected by performing an input operation on the dial "a". When the dial "a" is turned, a selected AF point in one AF point group shifts to one or two points of another group.

The shifting direction from each selected AF point is as described above with reference to FIG. 5(b). However, further details of the shift of selection are as follows. With the AF point a8 of the group G20 having been selected as shown in FIG. 9(a), for example, when a rightward rotative input operation is performed on the dial "a" in the direction of the arrow "dn" as shown in FIG. 5(a), two AF points b7 and b9 of the group G14 are selected. Then, if the rotative input is made further rightward, the AF point c8 of the group G05 is selected. The position of the AF point selection thus shifts from the points d7 and d9 of the group G14 eventually to the point e8 of the group G20, as shown in FIG. 9(a).

Then, at the AF point e8, if a leftward rotative input operation (in the direction of the arrow "up" shown in FIG. 5(a)) is performed on the dial "a", the position of the selected AF point shifts in the order of points e8 (group G20)→d7 and d9 (group G14)→c8 (group G05)→b7 and b9 (group G14)→a8 (group G20). Further, the position of the selected AF point does not shift in cases where a rightward rotative input is made with the AF point e8 having been selected and where a leftward rotative input is made with the AF point a8 having been selected.

Figure 9B:
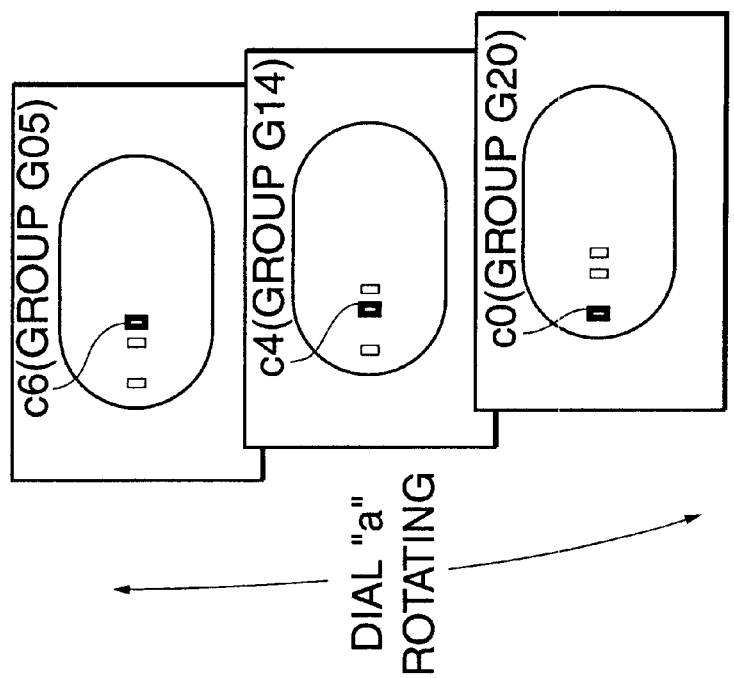
FIGS. 9(a) and 9(b) are diagrams for explaining the shifting of the position of AF point selection from one group to another according to a rotative input operation performed on the dial "a" shown in FIG. 1.
Figure 9A:
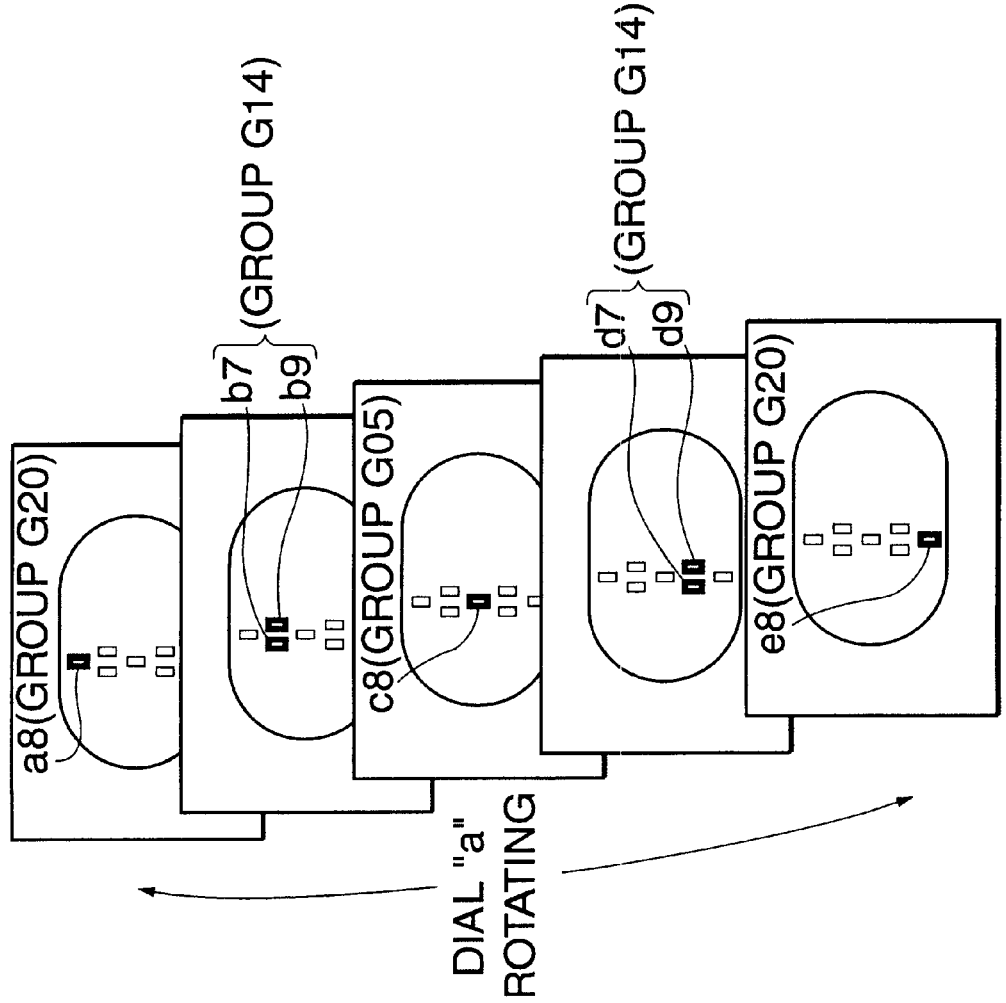

FIG. 9(b) shows a case where the AF point which has been selected is at one of points c6, c4 and c0. In this case, when a rotative input operation is performed on the dial "a" either in the direction of the arrow "up" or "dn", the selected AF point shifts in the order of point c0 (group G20)⇔ point c4 (group G14)⇔ point c6 (group G05). As mentioned in the foregoing, in a case where the selected AF point is currently at one of points c14, c16 and c20, the selected AF point shifts in the same manner. Further, the symbol "⇔" as used above means either "→" or "→", and thus means that the position of the selected AF point is shiftable in either of two opposite directions.

Figure 10:
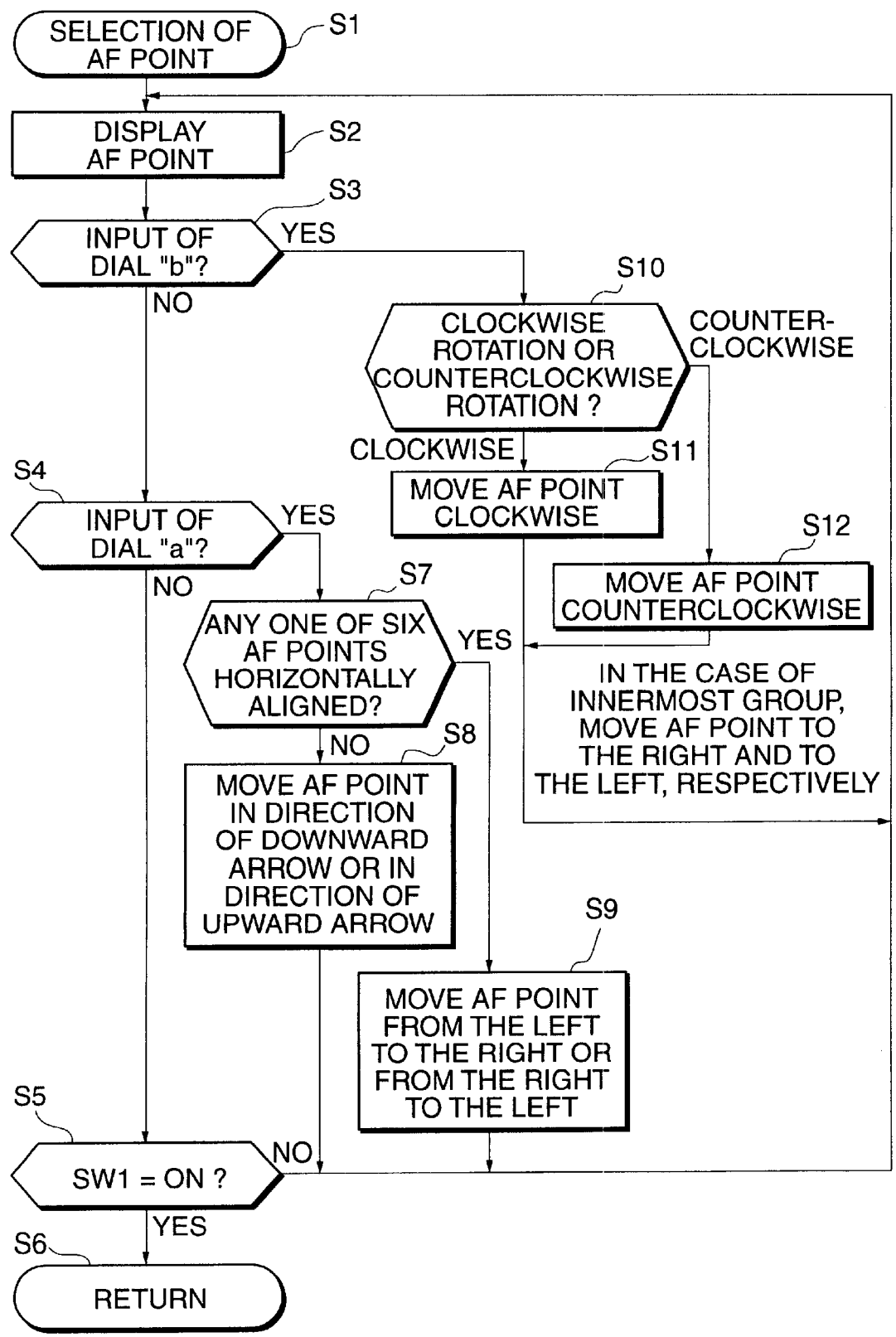
FIG. 10 is a flow chart showing actions of the camera according to the first embodiment in selecting an AF point.

FIG. 10 is a flow chart showing a flow of actions to be executed by the microcomputer 1 (shown in FIG. 1) in carrying out the above-stated AF point selection. The flow is next described below with reference to FIG. 10.

At step S1, when the AF point selection is called from a main program (not shown), the programmed control shifts to a subroutine for the AF point selection. At step S2, an AF point currently selected is displayed. At the next step S3, a check is made to find if any input is made through the dial "b". If so, the flow proceeds to step S10. If not, the flow proceeds to step S4.

At the step S10, a check is made to find if the input is made clockwise (rightward) or counterclockwise (leftward). If the input is found to be clockwise, the flow proceeds to step S11. If the input is found to be counterclockwise, the flow proceeds to step S12. At the step S11, the position of the selected AF point is shifted clockwise within the same group to an extent corresponding to the number of clicks of the input operation. For example, in the case of clockwise shift within the group G14, the AF point selecting position circularly shifts as "c4→b5→b7→b9→b11→b13→ - - - →d 11→d9→ - - - →c4" to an extent corresponding to the number of input clicks, as shown in FIGS. 7(a) and 7(b). At the step S12, with the input found to be counterclockwise, the AF point selecting position circularly shifts counterclockwise within the same group to such an extent that corresponds to the number of input clicks.

Figure 8B:
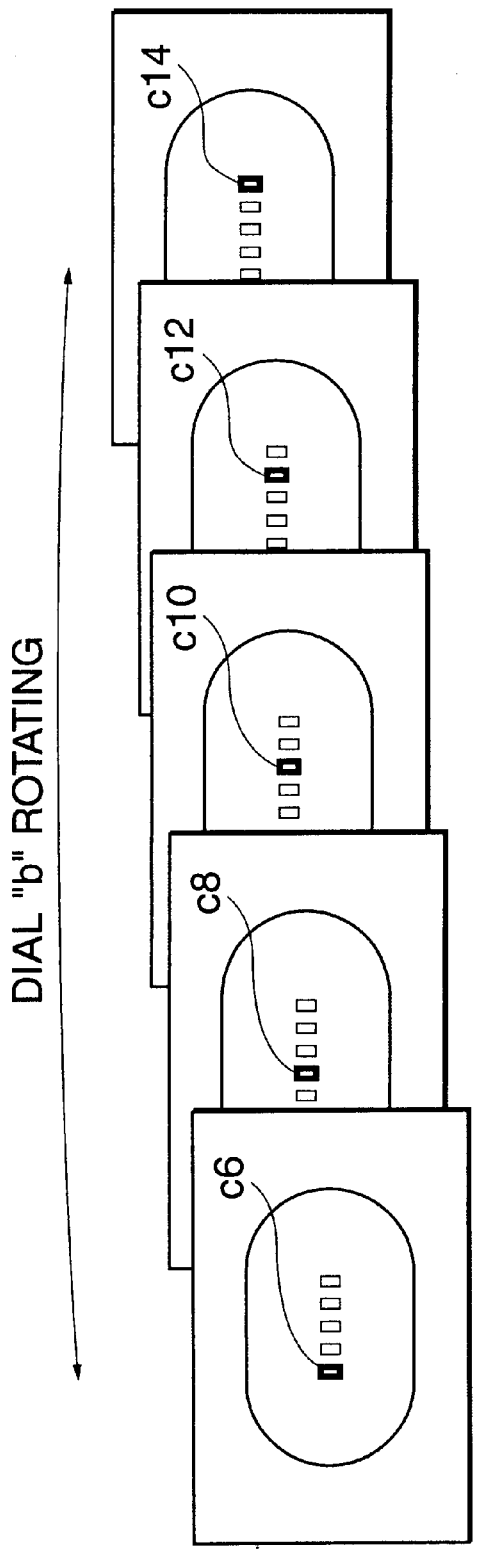

If the AF point to be selected at the step S11 or S12 is within the group G05, the position of AF point selection shifts rightward or leftward and not circularly, as mentioned in the foregoing with reference to FIGS. 8(a) and 8(b). In this instance, the AF point selecting position never shifts to the left from the AF point (c6) which is located at the left end of the group G05 and likewise never shifts to the right from the AF point (c14) which is located at the right end of the group G05. After the shift of the AF point selecting position, the flow returns to the step S2.

In a case where no input by the dial "b" is found at the step S3, the flow proceeds to step S4. At the step S4, a check is made to find if any input is made by the dial "a". If so, the flow proceeds to step S7. At the step S7, a check is made to find if the AF point currently selected is one of the six AF points c0, c4, c6, c14, c16 and c20 shown in FIG. 5(b). If so, the flow proceeds from the step S7 to step S9. At the step S9, the AF point selecting position shifts either rightward or leftward according to the direction of the arrow "dn" or "up" of the rotative input operation on the dial "a", as mentioned in the foregoing with reference to FIG. 5(b) or 9(b). If the currently selected AF point is found at the step S7 to be not any of the above-stated six AF points, the flow proceeds from the step S7 to step S8. At the step S8, the position of AF point selection shifts in the direction of either the downward arrow or upward arrow shown in FIG. 5(b) according to the direction of the arrow "dn" or "up" of the rotative input operation on the dial "a", as mentioned in the foregoing with reference to FIG. 5(b) or 9(a). After the execution of the step S8 or S9, the flow returns to the step S2.

Further, if no input by the dial "a" is found at the step S4, the flow proceeds from the step S4 to step S5. At the step S5, a check is made for the on-state of the switch SW1. In the case of the first embodiment, the switch SW1 is used as a switch for canceling the AF point selecting mode. If the switch SW1 is found to be in its on-state, the flow proceeds from the step S5 to step S6 to return the subroutine to the main program. If not, the flow returns to the step S2 to repeat the subroutine from the beginning thereof.

The arrangement of the first embodiment described above permits the position of AF point selection to be shifted in the same direction as the direction in which a rotative input operation is performed on the dial "b", and also permits a shift of the selecting position from one group of AF points to another AF point group by a rotative input operation on the dial "a", as mentioned in the foregoing with reference to FIGS. 4(a) and 4(b) to FIGS. 9(a) and 9(b). Therefore, the arrangement enables the user to quite directly perceive the process of the AF point selection and to efficiently make the AF point selection.

(Second Embodiment)

A second embodiment of the invention is next described. In the second embodiment, the camera and its component parts are arranged similarly to those of the first embodiment described above. Therefore, the details of them are omitted from the following description.

The following describes the second embodiment, by way of example, in a mode of using only nine AF points from among 45 AF points. FIG. 11(b) shows the selectable nine AF points, including one AF point c10 which is at the center of an image plane and eight AF points a4, a10, a16, c0, c20, e4, e10 and e16 which are arranged around the central AF point c10. The eight AF points which are in the peripheral area are assumed to form a group G08.

Figure 11A:
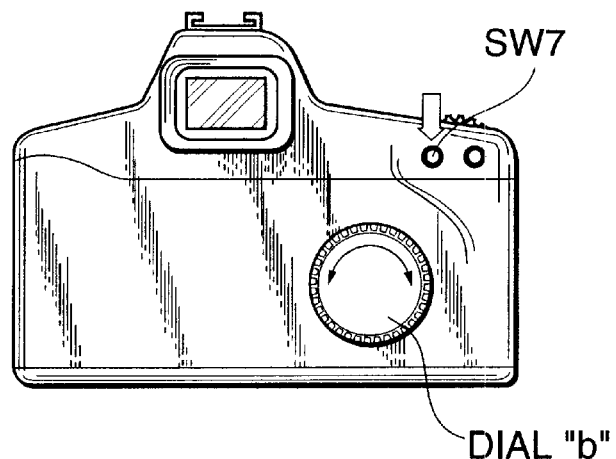
FIGS. 11(a), 11(b) and 11(c) are a diagram showing a camera according to a second embodiment of the invention and diagrams for explaining the shifting directions of AF point selection made in the camera according to the second embodiment.
Figure 11B:
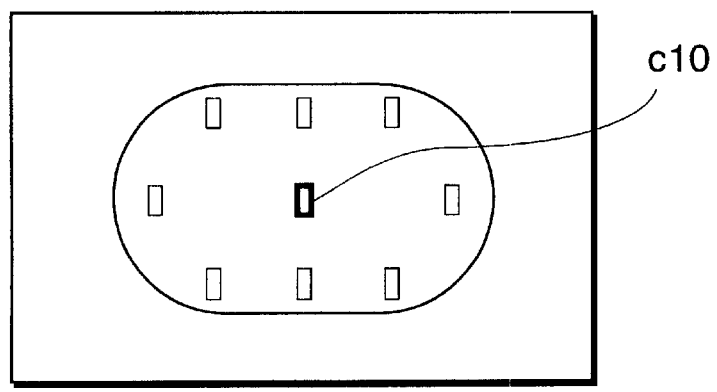

FIG. 11(a) shows a switch SW7 and a dial "b" which are disposed on the rear side of the camera. The switch SW7 is a push button switch which is arranged to be in an on-state only while it remains in a state of being pushed. The dial "b" is a rotative input member provided for inputting information on the direction and the number of clicks of a rotative input operation performed thereon.

FIG. 11(b) shows the AF points selectable when the switch SW7 is turned on. When the switch SW7 is pushed, the position of AF point selection shifts to the central point c10 wherever the current position of AF point selection is located within the AF point group G08.

Figure 11C:
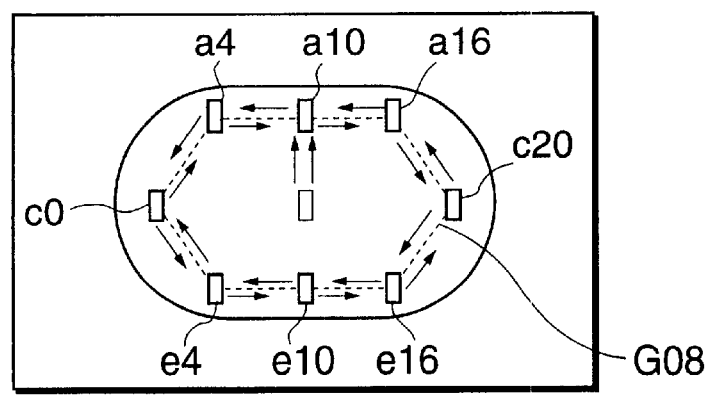

FIG. 11(c) shows the directions of shifts of the AF point selecting position taking place for a rotative input operation performed on the dial "b". The position of AF point selection shifts in the same direction as the rotating direction of the dial "b". In a case where the position of the AF point currently selected is located at the central AF point c10, the position of the selected AF point shifts to the point a10 in whichever direction the dial "b" is turned.

Figure 12:
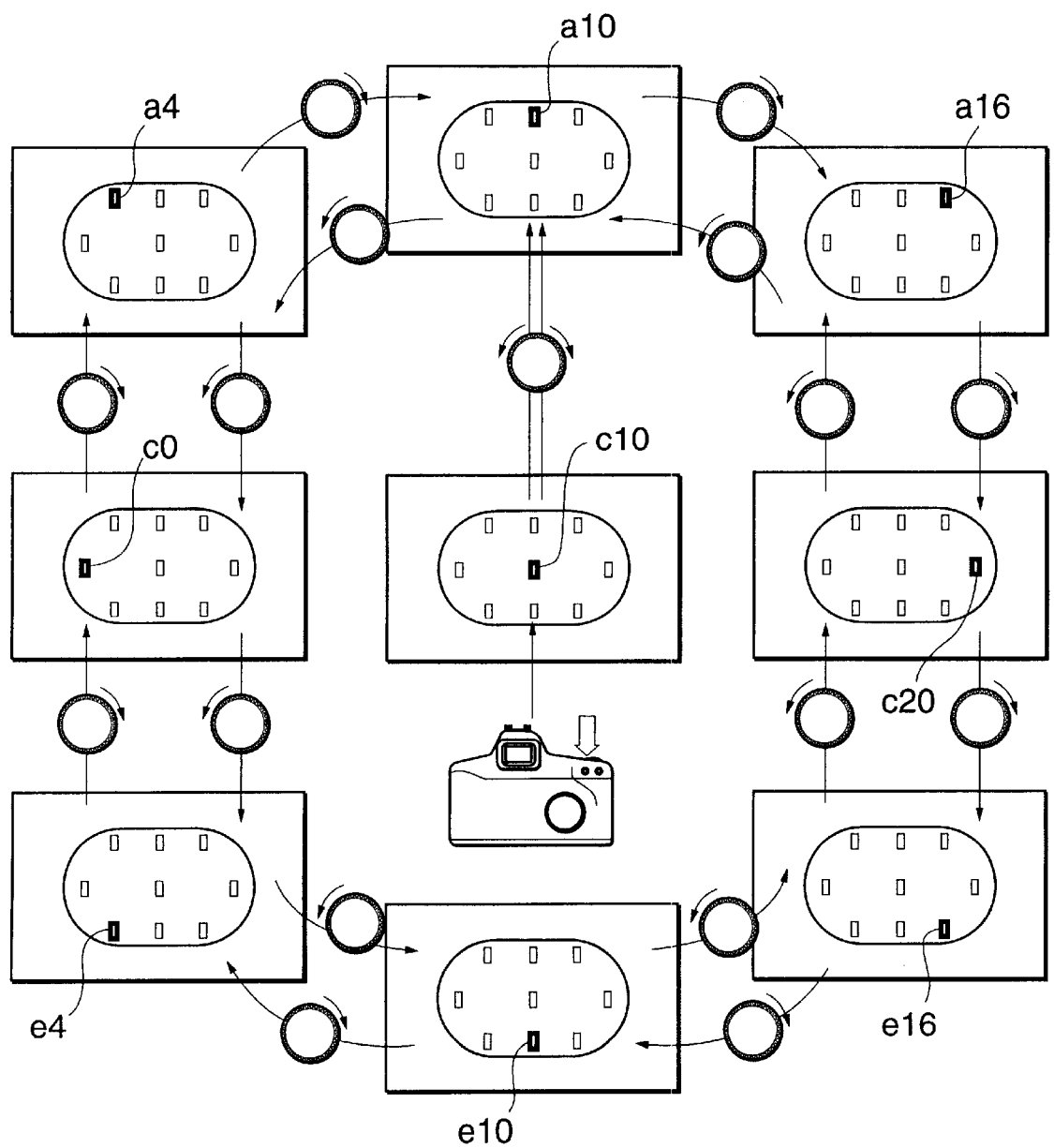
FIG. 12 is a diagram schematically showing the shifting directions of the AF point selection shown in FIG. 11.

FIG. 12 shows how the above-stated shifts of the position of the AF point selection take place.

Referring to FIG. 12, when the dial "b" is turned to the right to the extent of one click with the current position of the selected AF point located at the point a10, the AF point selecting position shifts to a point a16. Every time the dial "b" is further turned rightward by one click in this manner, the AF point selecting position shifts in the order of AF points c20→c16→e10→e4→c0→a4→a19→e16.

Further, when the dial "b" is turned leftward, the position of the selected AF point shifts in the order of AF points a10→a4→c0 e4→e10→e16→c20→a16. Then, when the switch SW7 is pushed while the selected AF point is located at any of these points, the position of the AF point selection shifts to the central AF point c10. With the selected AF point being the central AF point c10, the position of the selected AF point shifts to the AF point a10 when the dial "b" is turned by one click either rightward or leftward.

The position to which the selected AF point is to be shifted, with the current AF point located at the point c10, may be preset at a certain specific AF point or may be arranged to be at the stored AF point in a case where an AF point selected prior to the shift to the current selected point c10 is arranged to be stored.

The AF point c10 is arranged to be selected in an initial state. The initial state is obtained either when an initial state setting switch (not shown) is pushed (operated) or immediately after an automatic AF point selection mode in which the camera automatically selects an AF point is changed over to a manual mode in which the user is allowed to set an AF point as desired.

Figure 13:
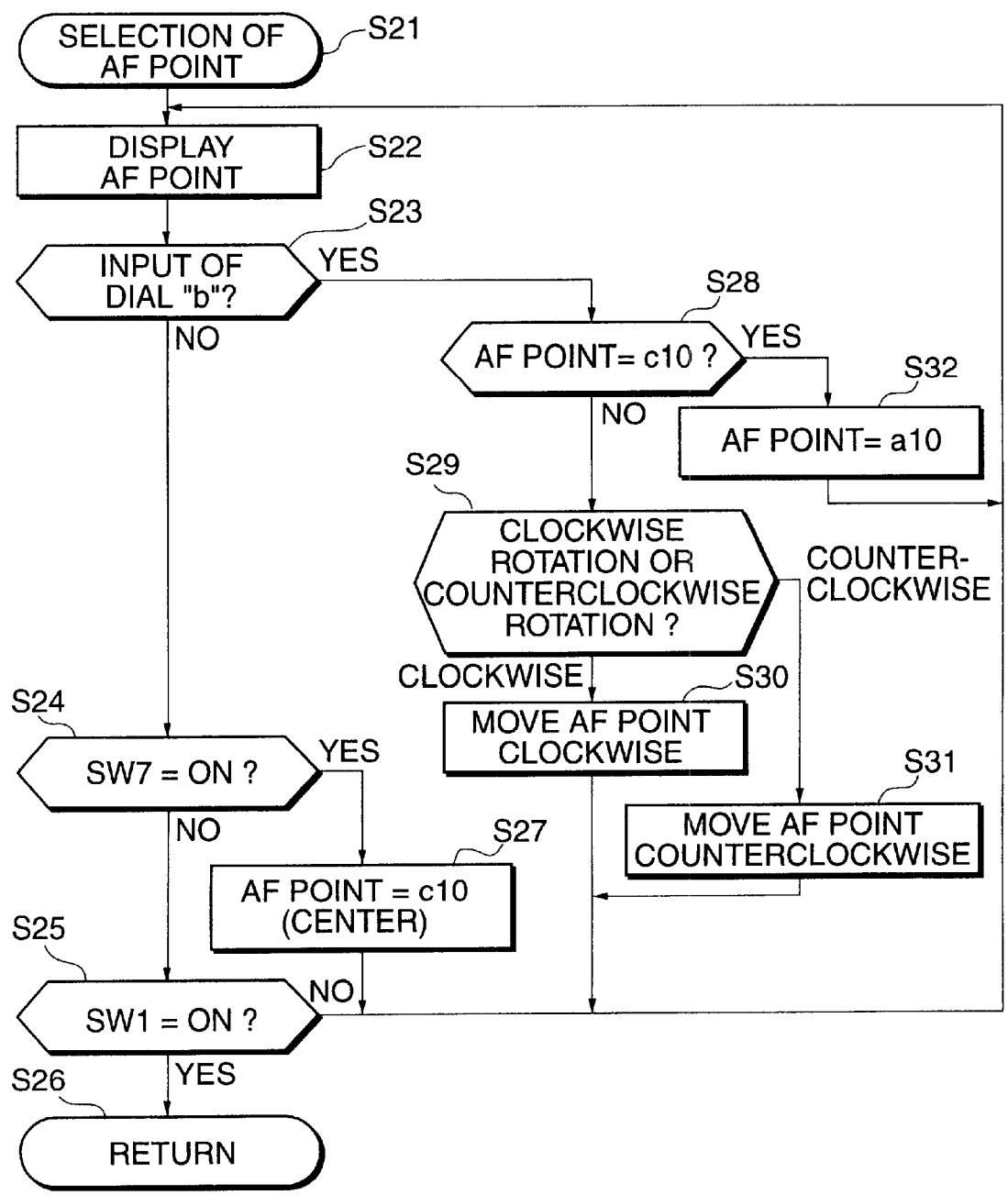
FIG. 13 is a flow chart showing actions of the camera according to the second embodiment in selecting an AF point.

FIG. 13 is a flow chart showing a flow of actions to be executed by the microcomputer 1 in making AF point selection in the mode of using nine AF points. The flow is described below with reference to FIG. 13.

At step S21, when the AF point selection is called from a main program, the programmed control shifts to a subroutine for the AF point selection. At step S22, an AF point currently selected is displayed. At the next S23, a check is made to find if any input is made through the dial "b". If so, the flow proceeds to step S28. If not, the flow proceeds to step S24.

At the step S28, a check is made to find if the currently selected AF point is the central AF point c10. If not, the flow proceeds to step S29. At the step S29, a check is made to find if the rotative input operation on the dial "b" is made clockwise (rightward) or counterclockwise (leftward). If the rotative input is found to be clockwise, the flow proceeds to step S30. If the rotative input is found to be counterclockwise, the flow proceeds to step S31. At the step S30, the selected AF point is shifted clockwise, as much as the number of clicks of the input operation. At the step S31, with the input found to be counterclockwise, the selecting position circularly shifts counterclockwise to an extent corresponding to the number of input clicks.

If the AF point currently selected is found at the step S28 to be the central AF point c10, the flow proceeds from the step S28 to step S32. At the step S32, the position of the selected AF point is shifted to the AF point a10. (Although it is omitted from this flow chart, if an input operation is performed to the extent of a plurality of clicks, the position of the selected AF point is shifted further from the AF point a10 in the direction of the input operation as much as the number of input clicks minus one.) After the shift of the selected AF point, the flow returns from the step S32 to the step S22 to display the AF point.

If no input by the dial "b" is found at the step S23, the flow proceeds to step S24. At the step S24, a check is made to find if the switch SW7 is in its on-state. If so, the flow proceeds from the step S24 to step S27. At the step S27, the position of the selected AF point is shifted to the AF point c10. After that, the flow returns to the step S22 to display the AF point. Further, if the switch SW7 is found at the step S24 to be not in its on-state, the flow proceeds from the step S24 to step S25. At the step S25, a check is made for the state of the switch SW1. In the case of the second embodiment, the switch SW1 is used for canceling the AF point selecting mode. Therefore, if the switch SW1 is found at the step S25 to be not in its on-state, the flow proceeds to step S26 to return the subroutine to the main program. If the switch SW1 is found to be in its on-state, the flow returns from the step S25 to the step S22 to repeat the subroutine from the beginning thereof.

The arrangement of the second embodiment permits the position of AF point selection to be shifted in the same direction as the direction in which a rotative input operation is performed on the dial "b", and also permits prompt selection of the center AF point by performing an input operation on the switch SW7. The arrangement, therefore, enables the user to quite directly perceive the process of the AF point selection and to efficiently make the AF point selection.

Further, in a case where an input operation is performed on the dial "b" while the current position of the selected AF point is at the central AF point, one of the peripheral AF points is instantly selected. Therefore, an AF point can be promptly selected, because it is possible to select a peripheral AF point by turning the dial "b" and to select the central AF point by operating the switch SW7.

(Third Embodiment)

A third embodiment of the invention is described as follows. The first and second embodiments are arranged to select AF points. However, the invention is not limited to the selection of AF points. In the case of the third embodiment, the points to be selected are spot light measuring areas which are arranged as shown in FIG. 14.

Figure 14:
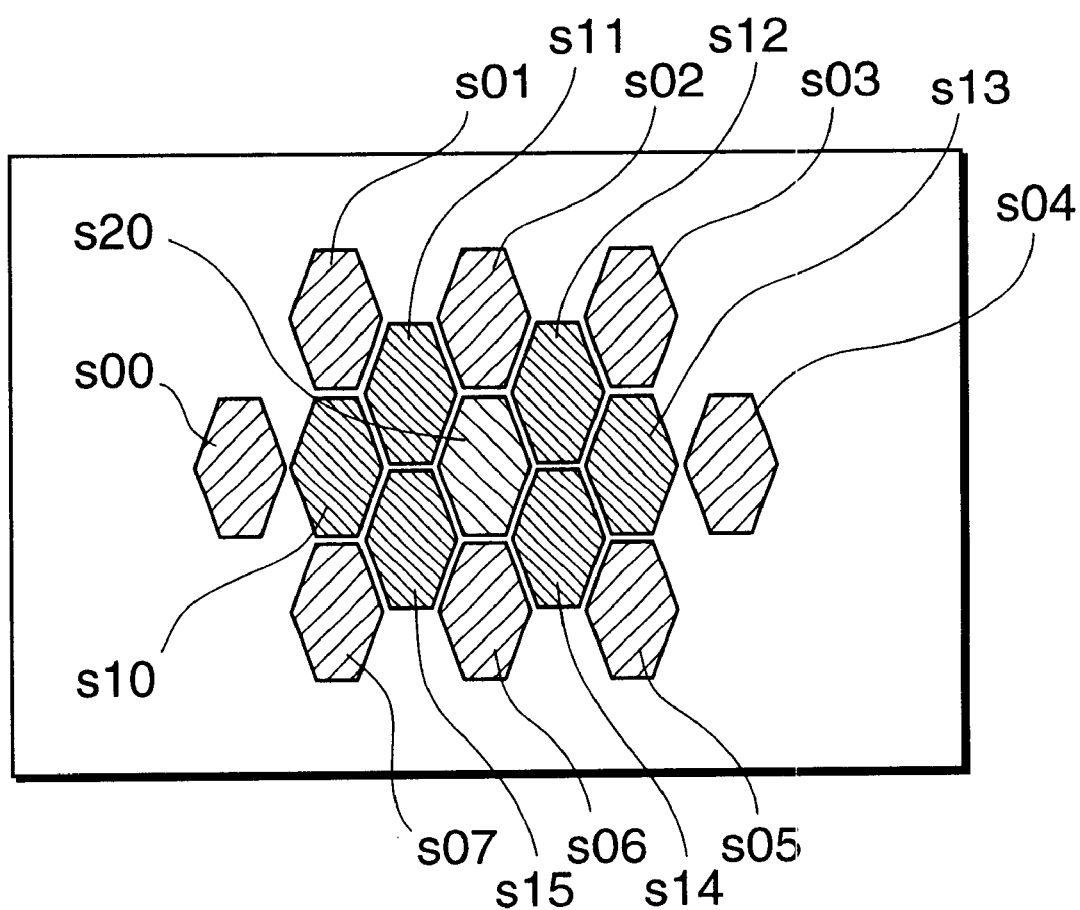
FIG. 14 is a diagram showing spot light measuring areas arranged to be selectable in a camera according to a third embodiment of the invention.

FIG. 14 shows the arrangement of 15 spot light measuring areas (or points) s00, s01, s02, s03, s04, s05, s06, s07, s10, s11, s12, s13, s14, s15 and s20.

Figure 15A:
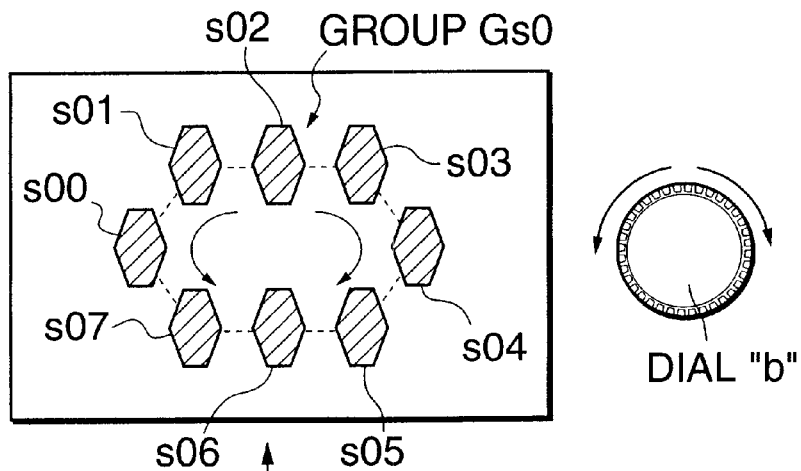
FIGS. 15(a), 15(b) and 15(c) are diagrams for explaining the shifting direction of spot-light-measuring-area selection to be made in the camera according to the third embodiment.
Figure 15B:
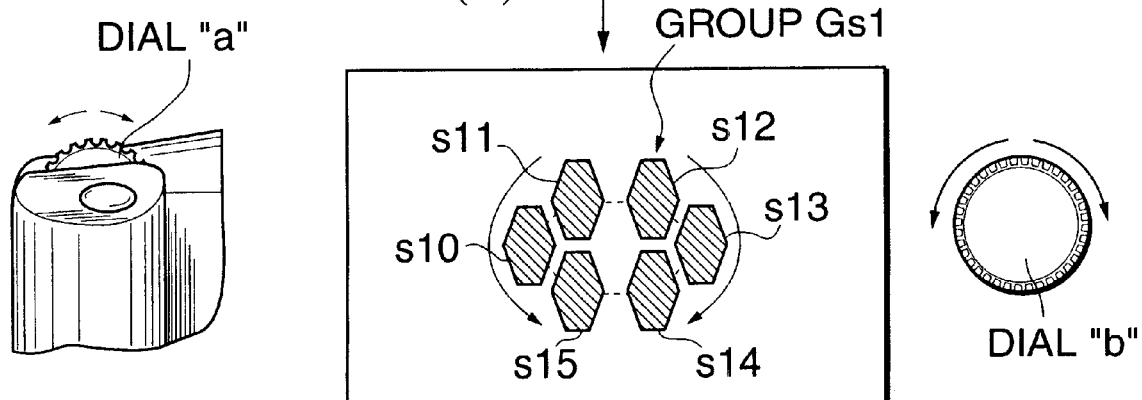
Figure 15C:
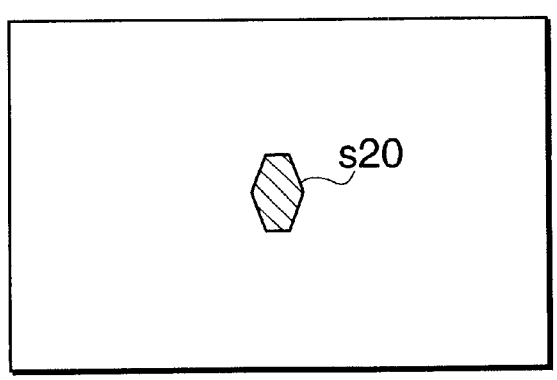

Further, as shown in FIGS. 15(*a*), 15(*b*) and 15(*c*), among the spot light measuring areas, the area s20 (see FIG. 15(*c*)) is located at the center of an image plane. A group Gs1 composed of the areas s10, s11, s12, s13, s14 and s15 is arranged around the central area s20, as shown in FIG. 15(*b*). Another group Gs0 composed of the areas s00, s01, s02, s03, s04, s05, s06 and s07 is arranged in the outermost (peripheral) area, as shown in FIG. 15(*a*).

These spot light measuring areas are selectable by performing input operations on dials "a" and "b".

Referring to FIGS. 15(*a*), 15(*b*) and 15(*c*), when the dial "b" is turned with one of the spot light measuring areas within the group Gs0 currently selected, the position of spot light measuring area selection shifts in the same direction as the rotating direction of the dial "b". More specifically, with the dial "b" turned rightward (clockwise), the selecting position shifts from one area to another in the order of areas s00→s01→s02 203→s04→s05→s06→s07→s00. With the dial "b" turned leftward (counterclockwise), the selecting position shifts in the reverse order of areas s00→s06→s05→s04 s03→s02→s01→s00.

Further, when the dial "b" is turned with one of the spot light measuring areas within the group Gs1 currently selected, the position of spot light measuring area selection also shifts in the same direction as the rotating direction of the dial "b". More specifically, with the dial "b" turned rightward, the selecting position shifts from one area to another in the order of areas s10→s11→s12→s13→s14→s15→s10. With the dial "b" turned leftward, the selecting position shifts in the reverse order of areas s15→s14→s13→s12→s11→s10.

In a case where the position of a selected spot light measuring area is within the group Gs0, when the dial "a" is turned rightward, the position of spot light measuring area selection shifts to an area within the other group Gs1. If the dial "a" is turned further rightward, the spot light measuring area s20 is selected. Further, with the spot light measuring area s20 selected, the position of the selected spot light measuring area cannot be changed by any further rightward rotative input operation on the dial "a".

If the dial "a" is turned leftward, the position of the selected spot light measuring area is shifted in the order of the area s20→an area within the group Gs1→an area within the group Gs0. Then, with the selected spot light measuring area located within the group Gs0, the spot light measuring area selecting position cannot be changed by any leftward rotative operation on the dial "a".

According to the arrangement of the third embodiment, not only an AF point but also a spot light measuring area can be promptly selected by shifting the selecting position in the direction of rotation of the dial "b" and by shifting the selecting position from one group to another group by operating the dial "a".

Figure 16:
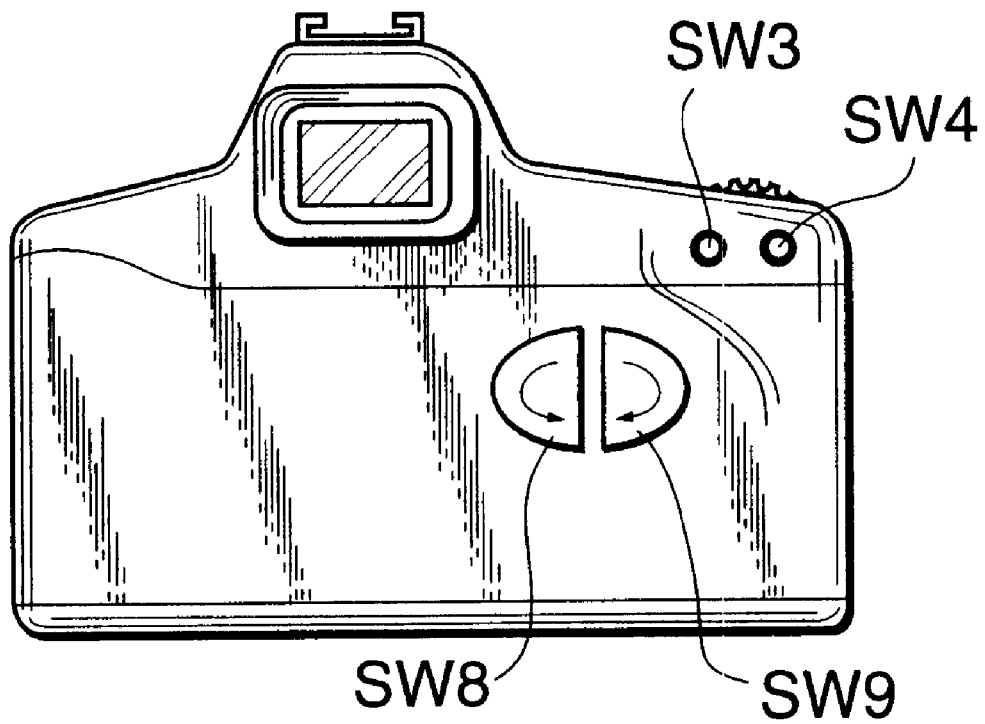
FIG. 16 is a rear view of a camera showing, by way of example, an input member which differs from the input members shown in the above-stated embodiments.

The above-described embodiments are arranged to have rotative input operations performed on the dials. The invention is, however, not limited to such a rotative input arrangement. The rotative input arrangement may be replaced with two input means arranged to be selected according to the rotative (circular) shifting direction of AF point selection, as switches SW8 and SW9 shown in FIG. 16. The switch arrangement shown in FIG. 16 effectively simplifies the shift of a selecting point to be made in the directions of rotation.

Figure 17A:
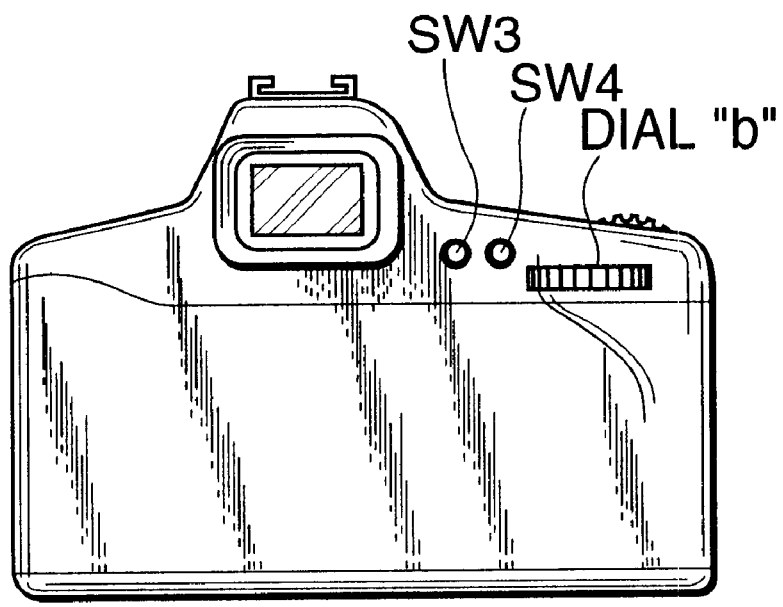
FIGS. 17(a) and 17(b) are rear and top views showing, by way of example, a camera having the dial "b" allocated differently from the above-stated embodiments.
Figure 17B:
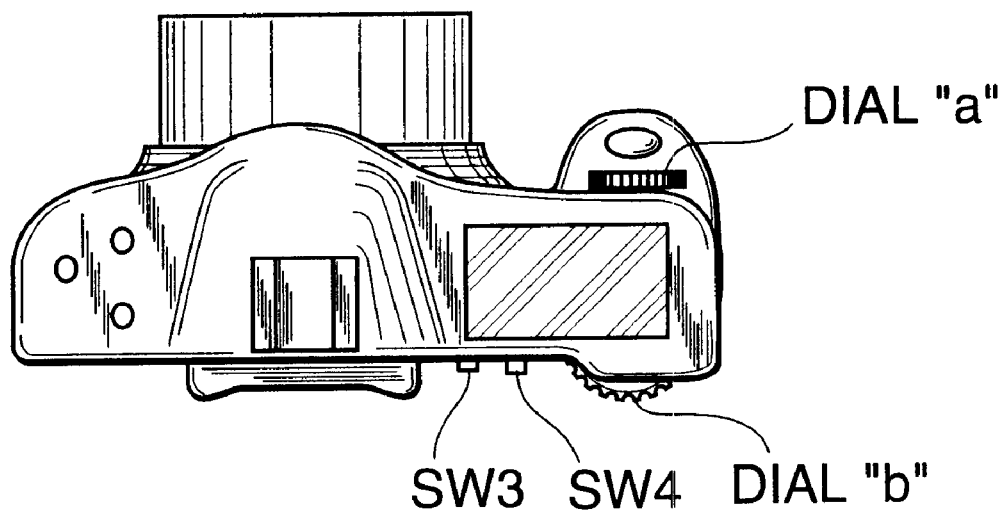
Figure 18A:
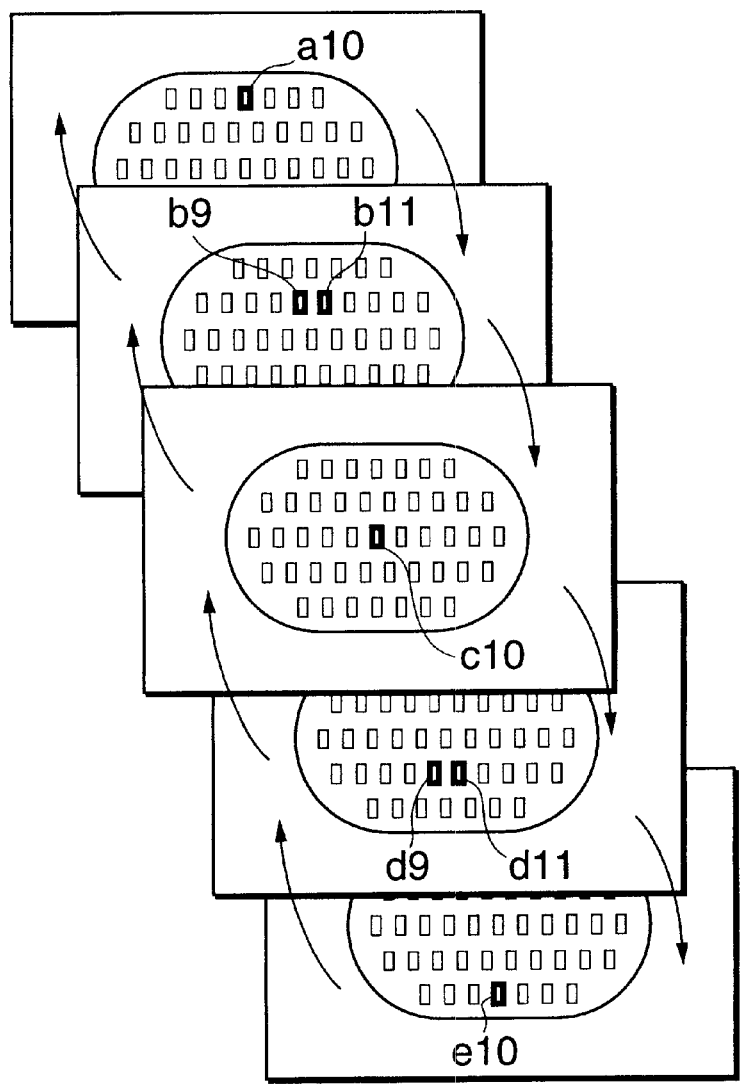
FIGS. 18(a), 18(b) and 18(c) are diagrams for explaining, by way of example, the shifting directions of AF point selection to be made by a conventional camera.
Figure 18B:
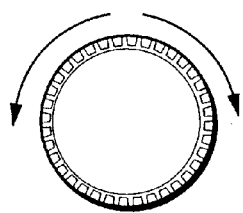
Figure 18C:
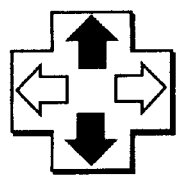
Figure 19A:
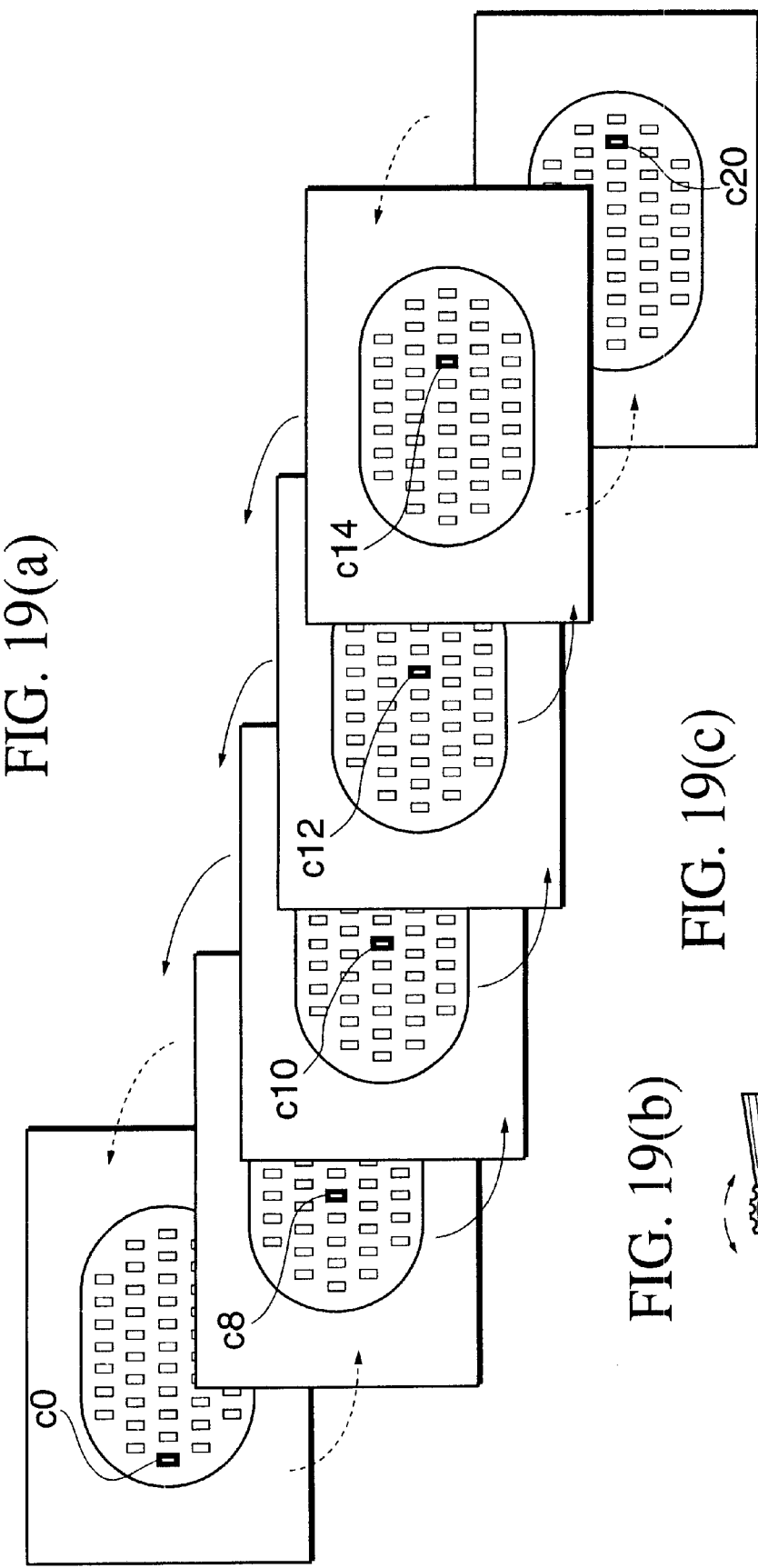
FIGS. 19(a), 19(b) and 19(c) are diagrams for explaining, as another example, the shifting directions of AF point selection to be made by the conventional camera.
Figure 19B:
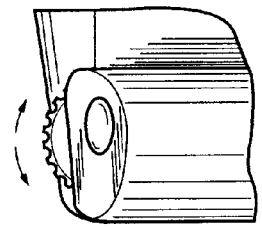
Figure 19C:
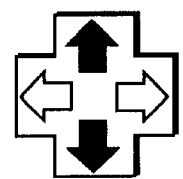

The plane of rotation of the dial "b" shown in FIG. 1 is arranged to be in parallel with the back lid of the camera. However, this arrangement may be changed to be perpendicular to the back lid of the camera as shown in FIGS. 17(a) and 17(b).

The advantages of the embodiments described above are recapitulated as follows.

(i) A selection point (an AF point or a light measuring area) within the group G20, G14, G08, Gs0 or Gs1 is arranged to be circularly selected in accordance with a rotative input operation on the dial "b" in a direction corresponding to the direction of the dial operation. The arrangement enables the user to efficiently select a selection point in the direction of circular shift while directly perceiving the process of selection.

(ii) With the dial "b" operated, a selection point is circularly selected within the group G08 or Gs0 according to the direction of the dial operation. With the switch SW7 or the dial "a" operated, a selection point of a group other than the group G08 or Gs0, such as the point c10 or s20, also can be selected. Therefore, not only a selection point in the direction of circular shift can be efficiently selected with direct perception but also any other selection point can be efficiently selected.

(iii) When the dial "b" is operated in a state of currently selecting the point c10 which is within an area encompassed with the selection points of the group G08, a specific point (a10 in the case of FIGS. 11(a) to 11(c)) is selected from among other selection points within the group G08. Therefore, not only a selection point in the direction of circular shift can be efficiently selected but also a specific selection point can be instantly selected.

(iv) The camera is arranged to have a group G14 or Gs0 and a group G20 or Gs1, each group being composed of a plurality of selection points. With one of selection points of the group G14 or Gs0 currently selected, when a rotative input operation is performed on the dial "b", the position of selection circularly shifts from one point to another within the group G14 or Gs0 in the direction corresponding to the direction of the input operation. If a currently selected point is within the other group G20 or Gs1, the rotative input operation on the dial "b" causes the position of selection to circularly shift within the group G20 or Gs1 in the direction corresponding to the direction of the input operation. Further, the position of selection is arranged to be shiftable from one group to another by operating the dial "a". Therefore, the selection within each group of selection points and the selection from among different groups can be both efficiently carried out.

(v) The camera has a group G14 which is composed of a plurality of AF points and a group G05 which is encompassed with the group G14 and is composed of a linear alignment of AF points. When the dial "b" is operated with one of AF points of the group G14 currently selected, the selecting position circularly shifts from one AF point to another within the group G14 in the direction corresponding to the direction of the input operation. If a currently selected point is within the other group G05, the input operation on the dial "b" causes the selecting position to shift within the group G05 in the direction corresponding to the direction of the input operation. Further, the position of selection is arranged to be shiftable from one group to the other by operating the dial "a". Therefore, the selection within each group of AF points and the selection from among different groups both can be efficiently carried out.

In the case of each embodiment disclosed, the invention is applied to a camera. However, the invention is not limited to cameras but is likewise applicable also to any other apparatus as long as it has a plurality of selection points within an image plane and is arranged to permit selecting one of the selection points by means of an operation member such as a dial or the like.

The embodiments disclosed have been described, by way of example, to have AF points or light measuring areas as the selection points. However, the selection points to which the invention is applicable are not limited to such points. The invention advantageously applies also to a selecting operation on distance measuring points to be used for measuring a distance to an object of shooting or on the operation modes of a camera.

Each of the selection point groups G20, G14, G08, Gs0 and Gs1 is arranged in a circular shape. However, the invention is not limited to the circular arrangement but also applies to a square arrangement.

According to the arrangement of the embodiments disclosed, a selection point selecting apparatus can be arranged to carry out selection of circularly arranged points in an efficient and directly-perceivable manner.

Further, according to the arrangement of the embodiments disclosed, a selection point selecting apparatus can be arranged to carry out selection of circularly arranged points in an efficient and directly-perceivable manner and also to be capable of efficiently selecting a selection point other than the circularly arranged points.

Further, according to the arrangement of the embodiments disclosed, a selection point selecting apparatus can be arranged to carry out selection of circularly arranged points in an efficient manner and also to be capable of instantly carrying out selection of a specific selection point.

Further, according to the arrangement of the embodiments disclosed, a selection point selecting apparatus can be arranged to be capable of efficiently selecting a point not only within each group of selection points but also from among different groups of selection points.

I claim:

1. A selection point selecting apparatus comprising:
   a selection point group including an upper side selection part including at least one selection point, an lower side selection part including at least one selection point, a right side selection part including at least one selection point and a left side selection part including at least one selection point;
   a first selecting device arranged to select, in response to an operation on a dial, a selection point from among said selection point group in a circular manner in a rotating direction corresponding to the rotating direction of said dial; and
   a second selecting device arranged to select, in response to an operation on an operation member different from said dial, a selection point other than the selection points of said selection point group.

2. A selection point selecting apparatus according to claim 1, wherein the selection point other than the selection points of said selection point group is located in an area encompassed by the selection points of said selection point group.

3. A selection point selecting apparatus according to claim 1, wherein the selection point other than the selection points of said selection point group is located approximately or exactly at the center of an area encompassed by the selection points of said selection point group.

4. A selection point selecting apparatus according to claim 1, wherein an operation member different from said dial is another dial or push member.

5. A selection point selecting apparatus according to claim 1, wherein the selection point other than the selection points of said selection point group is arranged to be selected when said selection point selecting apparatus is in an initial state.

6. A selection point selecting apparatus according to claim 1, wherein, when said dial is operated in a state in which the selection point other than the selection points of said first selection point group is selected, a predetermined selection point included in said selection point group is selected.

7. A selection point selecting apparatus comprising:
   a plurality of selection point groups, wherein each selection point group includes a selection point group including an upper side selection part including at least one selection point, a lower side selection part including at least one selection point, a right side selection part including at least one selection point and a left side selection part including at least one selection point;
   a first selecting device arranged to select, in response to an operation on a dial, a selection point in a circular manner in a rotating direction corresponding to the rotating direction of said dial; and
   a second selecting device arranged to select one of said selection point groups in response to an operation on an operation member different from said dial,
   wherein said first selecting device selects a selection point included in a selection point group selected by said second selecting device.

8. A selection point selecting apparatus comprising:
   a first selection point group including an upper side selection part including at least one selection point, a lower side selection part including at least one selection point, a right side selection part including at least one selection point and a left side selection part including at least one selection point;
   a second selection point group composed of a plurality of selection points and arranged in an area encompassed by said first selection point group;
   a first selecting device arranged to select a selection point, in response to an operation on a dial; and
   a second selecting device arranged to select one of said first selection point group and said second selection point group in response to an operation on an operation member different from said dial,
   wherein, in a state in which a selection point included in said first selection point group is selected, said first selecting device selects a selection point from among said first selection point group in a circular manner in a rotating direction corresponding to the rotating direction of the operation of said dial, and, in a state in which a selection point included in said second selection point is selected, said first selecting device selects a selection point from among said second selection point group.

9. A selection point selecting apparatus comprising:
   a selection point group composed of a plurality of selection points disposed in a circle;
   a first selecting device arranged to select, in response to an operation on a dial, a selection point from among said selection point group in a circular manner in a rotating direction corresponding to the rotating direction of said dial; and
   a second selecting device arranged to select, in response to an operation on an operation member different from said dial, a selection point other than the selection points of said selection point group.

10. A selection point selecting apparatus comprising:
    a plurality of selection point groups, wherein each selection point group composed of a plurality of selection points disposed in a circle;
    a first selecting device arranged to select, in response to an operation on a dial, a selection point in a circular manner in a rotating direction corresponding to the rotating direction of said dial; and
    a second selecting device able to select one of said selection point groups in response to an operation on an operation member different from said dial,
    wherein said first selecting device selects a selection point included in a selection point group selected by said second selecting device.

11. A camera comprising:
    a selection point group including an upper side selection part including at least one selection point, a lower side selection part including at least one selection point, a right side selection part including at least one selection point and a left side selection part including at least one selection point;
    a first selecting device arranged to select, in response to an operation on a dial, a selection point from among said selection point group in a circular manner in a rotating direction corresponding to the rotating direction of said dial; and
    a second selecting device arranged to select, in response to an operation on an operation member different from said dial, a selection point other than the selection points of said selection point group.

12. A camera according to claim 11, wherein the selection point other than the selection points of said selection point group is located in an area encompassed by the selection points of said first selection point group.

13. A camera according to claim 11, wherein each of said selection points is a mark indicating a position at which information on focusing is to be detected or a distance to an object is to be detected or light measurement is to be detected.

14. A camera comprising:
- a selection point group composed of a plurality of selection points disposed in a circle;
- a first selecting device arranged to select, in response to an operation on a dial, a selection point from among said selection point group in a circular manner in a rotating direction corresponding to the rotating direction of said dial; and
- a second selecting device arranged to select, in response to an operation on an operation member different from said dial, selection point other than the selection points of said selection point group.

15. A camera according to claim 14, wherein each of said selection points is a mark indicating a position at which information on focusing is to be detected or a distance to an object is to be detected or light measurement is to be detected.

16. A camera comprising:
- a plurality of selection point groups, wherein each selection point group is composed of a plurality of selection points disposed in a circle;
- a first selecting device arranged to select, in response to an operation on a dial, a selection point in a circular manner in a rotating direction corresponding to the rotating direction of said dial; and
- a second selecting device able to select one of said selection point groups in response to an operation on an operation member different from said dial,
- wherein said first selecting device selects a selection point included in a selection point group selected by said second selecting device.

17. A camera according to claim 16, wherein each of said selection points is a mark indicating a position at which information on focusing is to be detected or a distance to an object is to be detected or light measurement is to be detected.

* * * * *

UNITED STATES PATENT AND TRADEMARK OFFICE
CERTIFICATE OF CORRECTION

PATENT NO.    : 6,512,888 B2
DATED         : January 28, 2003
INVENTOR(S)   : Keisuke Aoyama It is certified that error appears in the above-identified patent and that said Letters Patent is hereby corrected as shown below:

Column 6,
Line 11, "separately" should read -- separate --.

Column 9,
Line 22, "→" (second occurrence) should read -- ← --.
Line 46, "d 11" should read -- d11 --.

Column 11,
Line 13, "e4" should read -- → e4 --.

Column 12,
Line 61, "203" should read -- → s03 --.
Line 64, "s03" should read -- → s03 --.

Column 15,
Line 16, "an lower" should read -- a lower --.

Signed and Sealed this

Eighteenth Day of November, 2003

JAMES E. ROGAN
*Director of the United States Patent and Trademark Office*